(12) United States Patent
Galbraith et al.

(10) Patent No.: US 10,990,295 B2
(45) Date of Patent: Apr. 27, 2021

(54) WRITE LEVEL OPTIMIZATION FOR NON-VOLATILE MEMORY

(71) Applicant: Western Digital Technologies, Inc., San Jose, CA (US)

(72) Inventors: Richard Leo Galbraith, Rochester, MN (US); Niranjay Ravindran, Rochester, MN (US); Jonas Andrew Goode, Lake Forest, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 195 days.

(21) Appl. No.: 16/157,520

(22) Filed: Oct. 11, 2018

(65) Prior Publication Data
US 2019/0384504 A1    Dec. 19, 2019

Related U.S. Application Data

(60) Provisional application No. 62/685,168, filed on Jun. 14, 2018.

(51) Int. Cl.
| G06F 12/00 | (2006.01) |
| G06F 13/00 | (2006.01) |
| G06F 13/28 | (2006.01) |
| G06F 3/06  | (2006.01) |

(52) U.S. Cl.
CPC ......... G06F 3/0616 (2013.01); G06F 3/0653 (2013.01); G06F 3/0659 (2013.01); G06F 3/0679 (2013.01)

(58) Field of Classification Search
CPC .......................... G06F 3/0653; G06F 11/0703
USPC ........................................................ 711/103
See application file for complete search history.

(56) References Cited

U.S. PATENT DOCUMENTS

| 2008/0263265 A1* | 10/2008 | Litsyn ................ G11C 11/5642 711/103 |
| 2012/0240007 A1* | 9/2012 | Barndt ............... H03M 13/1108 714/758 |

OTHER PUBLICATIONS

Wikipedia, Matrix (mathematics), https://en.wikipedia.org/wiki/Matrix_(mathematics) (Year: 2011).*
Richard David Barndt et al., U.S. Appl. No. 15/665,200, filed Jul. 31, 2017, 51 pages.

* cited by examiner

*Primary Examiner* — Charles Rones
*Assistant Examiner* — Sidney Li
(74) *Attorney, Agent, or Firm* — Loza & Loza, LLP; Gabriel Fitch

(57) ABSTRACT

The disclosure relates in some aspects to optimizing writes levels used for programming a non-volatile memory device. In some aspects, the disclosure relates to an algorithmic approach for adjusting write levels for a NAND flash device. For example, write level gradients may be iteratively generated based on memory cell bin distribution statistics relating to the number and direction of errors across bin boundaries.

20 Claims, 21 Drawing Sheets

BASIC CORRELATION MODEL $$E = W * C$$

where:

$E = \begin{bmatrix} LOG((BND\_BER_1)*P_1) \\ LOG((BND\_BER_2)*P_2) \\ LOG((BND\_BER_3)*P_3) \\ LOG((BND\_BER_4)*P_4) \\ LOG((BND\_BER_5)*P_5) \\ LOG((BND\_BER_6)*P_6) \\ LOG((BND\_BER_7)*P_7) \\ LOG(PAGE\_BER\_TRGT) \end{bmatrix}$ $W = \begin{bmatrix} \Delta W_1 & \Delta W_2 & \Delta W_3 & \Delta W_4 & \Delta W_5 & \Delta W_6 & \Delta W_7 \end{bmatrix}$ $C = \begin{bmatrix} -1 & 0 & 0 & 0 & 0 & 0 & 0 & 0 \\ 1 & -1 & 0 & 0 & 0 & 0 & 0 & 0 \\ 0 & 1 & -1 & 0 & 0 & 0 & 0 & 0 \\ 0 & 0 & 1 & -1 & 0 & 0 & 0 & 0 \\ 0 & 0 & 0 & 1 & -1 & 0 & 0 & 0 \\ 0 & 0 & 0 & 0 & 1 & -1 & 0 & 0 \\ 0 & 0 & 0 & 0 & 0 & 1 & -1 & -\alpha \\ 0 & 0 & 0 & 0 & 0 & 0 & 0 & \alpha \end{bmatrix}$

WRITE LEVEL GRADIENT GENERATION $$W = E * C^+$$

where:

$W = [\Delta W_1, \Delta W_2, \Delta W_3, \Delta W_4, \Delta W_5, \Delta W_6, \Delta W_7]$ $E = [\mathrm{LOG}((\mathrm{BND\_BER}_1)*P_1), \mathrm{LOG}((\mathrm{BND\_BER}_2)*P_2), \mathrm{LOG}((\mathrm{BND\_BER}_3)*P_3), \mathrm{LOG}((\mathrm{BND\_BER}_4)*P_4), \mathrm{LOG}((\mathrm{BND\_BER}_5)*P_5), \mathrm{LOG}((\mathrm{BND\_BER}_6)*P_6), \mathrm{LOG}((\mathrm{BND\_BER}_7)*P_7), \mathrm{LOG}(\mathrm{PAGE\_BER\_TRGT})]$

WRITE LEVEL OPTIMIZATION FOR NON-VOLATILE MEMORY

PRIORITY CLAIM

This application claims priority to and the benefit of Provisional Patent Application No. 62/685,168, filed in the United States Patent and Trademark Office on Jun. 14, 2018, the entire content of which is incorporated herein by reference as if fully set forth below in its entirety and for all applicable purposes.

FIELD

The disclosure relates, in some embodiments, to non-volatile memory (NVM) devices and memory controllers for use therewith. More specifically, but not exclusively, the disclosure relates to generating writes levels used for programming an NVM device.

INTRODUCTION

Solid state data storage devices (hereafter referred to as SSD storage devices) incorporating non-volatile memories (NVMs), such as flash NAND memories, are replacing or supplementing conventional rotating hard disk drives for mass storage in many consumer or industrial electronics and computers. In a typical SSD storage device-based product, a host computing device includes or communicates with an NVM device controller that in turn controls access to one or more NVM devices.

An SSD storage device handles host requests such as host write requests and host read requests to respectively write data to and read data from an NVM array of the SSD storage device. An SSD storage device writes (i.e., programs) data into an NVM array by applying a particular threshold voltage to cells of the NVM array. The magnitude of the threshold voltage corresponds to a value to be stored by a cell (e.g., a numerical value of 0, 1, etc.). Thus, the SSD storage device uses different threshold voltages (referred to as write levels) to program different voltage levels (corresponding to different numerical values) into a cell. The SSD storage device may therefore read a cell by applying different threshold voltages (read levels) to the cell to determine the voltage level that has been programmed into the cell.

The actual voltage level programmed into a cell by a write level depends on several factors. For example, some cells are easier to program than other cells. That is, the application of a particular write level may result in the programmed voltage level being higher for some cells than for other cells. The capability of a cell to be programmed also may be affected by the number of program/erase cycles for the cell and the temperature of the cell. Also, the programmed voltage level of a cell may change over time due to electron loss (e.g., if a cell has not been rewritten for some time). Thus, the actual voltage programmed into a cell by a given write level may change over time. As such, for a set of cells, the programmed voltage level may be characterized by a distribution over a range of voltages. A corresponding distribution exists for each of the write levels (e.g., two write levels for single-level cell (SLC) technology, four levels for multi-level cell (MLC) technology, and so on). Due to the above factors and potentially other factors, the distribution for a set of cells may change over time. Consequently, the write levels specified for an SSD storage device might not provide optimum write performance over all of the operating conditions and the entire operating life of the SSD storage device. In view of the above, it would be advantageous to better optimize the write levels used by SSD storage devices.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage apparatus that includes a non-volatile memory array and a processor coupled to the non-volatile memory array. In one example, the processor is configured to: determine error information for a plurality of memory cell bin boundaries of the non-volatile memory array, determine at least one set of write levels for programming the non-volatile memory array, wherein the at least one set of write levels is based on the error information, and program the non-volatile memory array using a particular set of write levels of the least one set of write levels.

One embodiment of the disclosure provides a data storage method. In one example, the method includes: obtaining data from a non-volatile memory array; determining error information for a plurality of memory cell bin boundaries of the non-volatile memory array, wherein the determination of the error information is based on the data; determining at least one set of write levels for programming the non-volatile memory array, wherein the at least one set of write levels is based on the error information; and programming the non-volatile memory array using a particular set of write levels of the least one set of write levels.

One embodiment of the disclosure provides a data storage apparatus. In one example, the apparatus includes: means for determining error information for a plurality of memory cell bin boundaries of a non-volatile memory array; means for determining at least one set of write levels for programming the non-volatile memory array, wherein the at least one set of write levels is based on the error information; and means for programming the non-volatile memory array using a particular set of write levels of the least one set of write levels.

One embodiment of the disclosure provides a non-transitory computer-readable medium storing computer-executable code for storing data. In one example, the computer-readable medium includes code to: determine error information for a plurality of memory cell bin boundaries of a non-volatile memory array, determine at least one set of write levels for programming the non-volatile memory array, wherein the at least one set of write levels is based on the error information, and program the non-volatile memory array using a particular set of write levels of the least one set of write levels.

One embodiment of the disclosure provides an apparatus for controlling a non-volatile memory device that includes an interface to the non-volatile memory device and a processor coupled to the interface. In one example, the processor is configured to: obtain error information for a plurality of memory cell bin boundaries of the non-volatile memory device, determine a plurality of sets of write levels for programming the non-volatile memory device based on the error information, and output the plurality of sets of write levels via the interface.

One embodiment of the disclosure provides a method of controlling a non-volatile memory device. In one example, the method includes: generating error information for a plurality of memory cell bin boundaries of the non-volatile memory device; determining a plurality of sets of write levels for programming the non-volatile memory device based on the error information; and outputting the plurality of sets of write levels.

One embodiment of the disclosure provides an apparatus for controlling a non-volatile memory device. In one example, the apparatus includes: means for obtaining error information for a plurality of memory cell bin boundaries of the non-volatile memory device; means for determining a plurality of sets of write levels for programming the non-volatile memory device based on the error information; and means for outputting the plurality of sets of write levels.

One embodiment of the disclosure provides a non-transitory computer-readable medium storing computer-executable code for controlling a non-volatile memory device. In one example, the computer-readable medium includes code to: obtain error information for a plurality of memory cell bin boundaries of the non-volatile memory device, determine a plurality of sets of write levels for programming the non-volatile memory device based on the error information, and output the plurality of sets of write levels via the interface.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 11 illustrates an example of a basic correlation model for optimizing write levels in accordance with one or more aspects of the disclosure.

FIG. 12 illustrates an example of write level gradient generation in accordance with one or more aspects of the disclosure.

DETAILED DESCRIPTION

Figure 1:
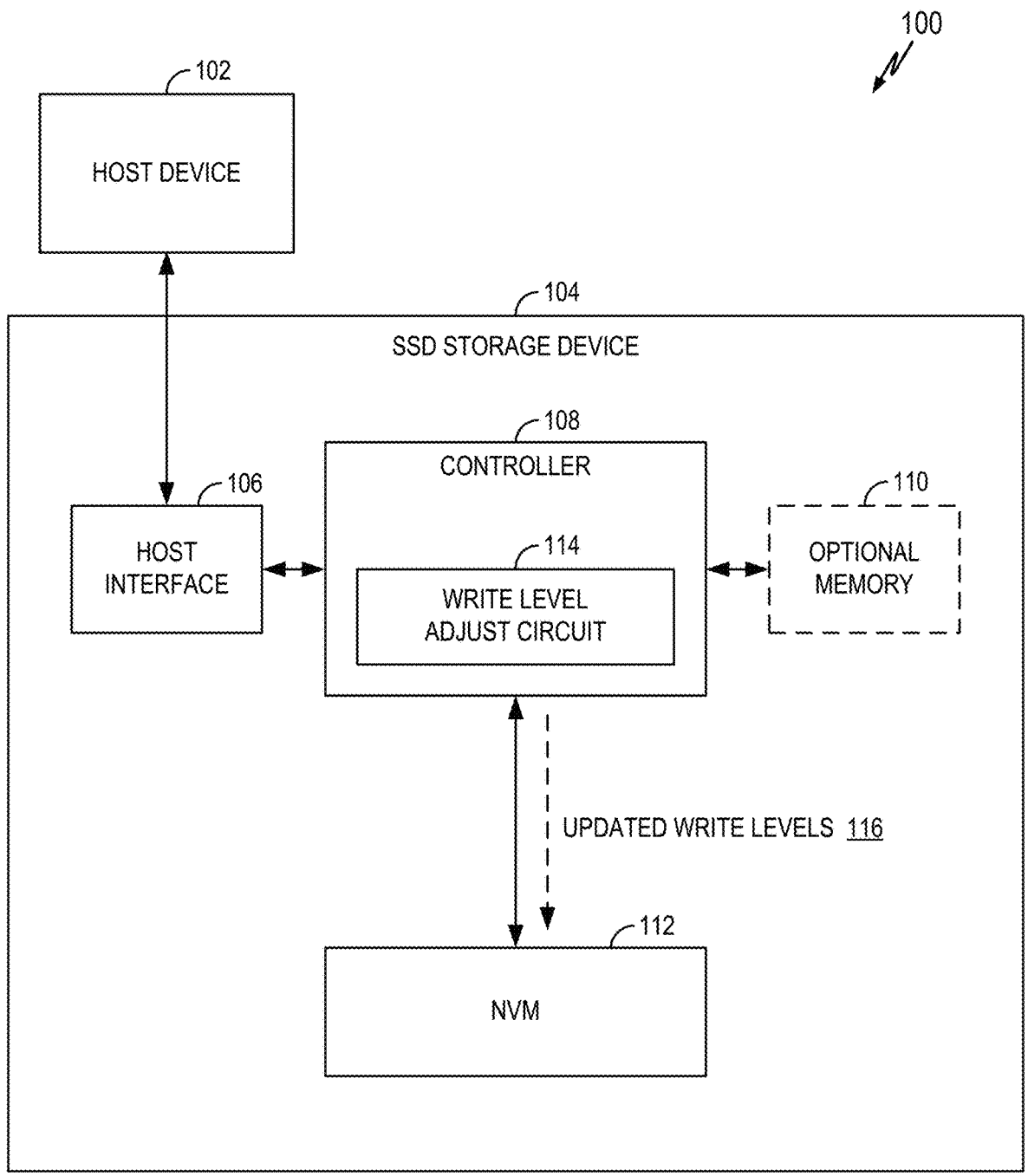
FIG. 1 illustrates an example memory system including a solid state device (e.g., an SSD storage device) configured in accordance with one or more aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The disclosure relates in some aspects to various apparatuses, systems, methods, and media for providing write levels for an NVM device. For example, an SSD storage device, a memory controller, a programmer device, or some other suitable device may iteratively generate write level gradients (e.g., indicating a magnitude and a direction) based on memory cell bin distribution statistics relating to the number and direction of errors across bin boundaries of the NVM device. These gradients are used to adjust the write levels used by the NVM device so that the write levels can be adjusted based on one or more conditions associated with the NVM device (e.g., age, temperature, retention, etc.).

For purposes of illustration, various aspects of the disclosure will be described in the context of a memory system that includes NAND memory technology. A NAND device may be referred to herein as a NAND Flash memory, a NAND memory device, a NAND flash, or a NAND. Generally speaking, a NAND device is a non-volatile memory having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/address logic components, I/O components, and data register components. It should be appreciated that the teachings herein are also applicable to other forms of memory (e.g., NVM other than NAND devices).

In NAND devices, the write levels determine the effective width and spacing of the storage bins within the total voltage range of a NAND cell. The optimal adjustment of these write levels is important to achieve the best performance and endurance of the NAND device.

For conventional NAND devices, a heuristic trial and error method is used to optimize the write levels. Given a default starting condition for the write levels, experimental measurements are taken and an educated guess is made for shifting write levels that would appear to move the system in a preferred direction. For NAND devices with relatively few write levels (e.g., SLC with 2 levels per cell or MLC with 4 levels per cell) this approach has been considered adequate.

For triple-level cell (TLC) technology there are 8 write levels per cell that can be adjusted, and for quad-level cell (QLC) technology there are 16 write levels per cell that can be adjusted. Consequently, it may be difficult to efficiently identify the optimum write levels for these technologies using a heuristic approach.

In view of the above deficiencies, the disclosure relates in some aspects to a mathematical method for identifying optimal write levels (e.g., for a given use condition) in an efficient manner. In some aspects, write level optimization (WLO) in accordance with the teachings herein involves a mathematical gradient method for adapting the write levels. These aspects and other aspects of the disclosure will now be described in more detail in conjunction with FIGS. 1-12.

Example Memory System

FIG. 1 illustrates an embodiment of a memory system 100 that includes a host device 102 and an SSD storage device 104 communicatively coupled to the host device 102. The host device (e.g., a host computer) 102 provides commands to the SSD storage device 104 for transferring data between the host device 102 and the SSD storage device 104. For example, the host device 102 may provide a write command to the SSD storage device 104 for writing data to the SSD storage device 104 or a read command to the SSD storage device 104 for reading data from the SSD storage device 104. The host device 102 may be any system or device having a need for data storage or retrieval and a compatible interface for communicating with the SSD storage device 104. For example, the host device 102 may a computing device, a personal computer, a portable computer, or workstation, a server, a personal digital assistant, a digital camera, a digital phone, or the like.

The SSD storage device 104 includes a host interface 106, a controller 108, an optional memory 110, and a non-volatile memory (NVM) 112. The host interface 106 is coupled to the controller 108 and facilitates communication between the host device 102 and the controller 108. Additionally, the controller 108 is coupled to the memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host device 102 includes the SSD storage device 104 (e.g., the host device 102 and the SSD storage device 104 are implemented as a single component). In other embodiments, the SSD storage device 104 is remote with respect to the host device 102 or is contained in a remote computing system coupled in communication with the host device 102. For example, the host device 102 may communicate with the SSD storage device 104 through a wireless communication link.

The controller 108 controls operation of the SSD storage device 104. In various embodiments, the controller 108 receives commands from the host device 102 through the host interface 106 and performs the commands to transfer data between the host device 102 and the NVM 112. In addition, the controller 108 performs internal operations such as garbage collection operations, data integrity operations, and wear leveling operations. The controller 108 may include any type of processing device, such as a microprocessor, a microcontroller, an embedded controller, a logic circuit, software, firmware, or the like, for controlling operation of the SSD storage device 104.

In some embodiments, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host device 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host device 102 and the NVM 112. For example, the memory 110 or a portion of the memory 110 may be a cache memory.

The controller 108 includes a write level adjust circuit 114 for determining the write levels to be used by the NVM 112 and sending updated write levels 116 to the NVM. In some embodiments, the controller 108 calculates the write levels. For example, the controller 108 may calculate new write levels in response to a trigger event (e.g., a condition at the SSD storage device 104). Examples of triggers that cause the controller 108 to update the write levels may include, without limitation, a measured temperature reaching a threshold, a program/erase cycle count reaching a threshold, data retention time reaching a threshold, an error rate exceeding a threshold, etc. In some embodiments, the controller 108 receives the write levels (e.g., different sets of write levels associated with different conditions) from another entity. In this case, the controller 108 may select a set of write levels to be used by the NVM 112 in view of one or more current conditions (e.g., temperature, time, number of P/E cycles, etc.).

Example Cell Distributions

Figure 2:
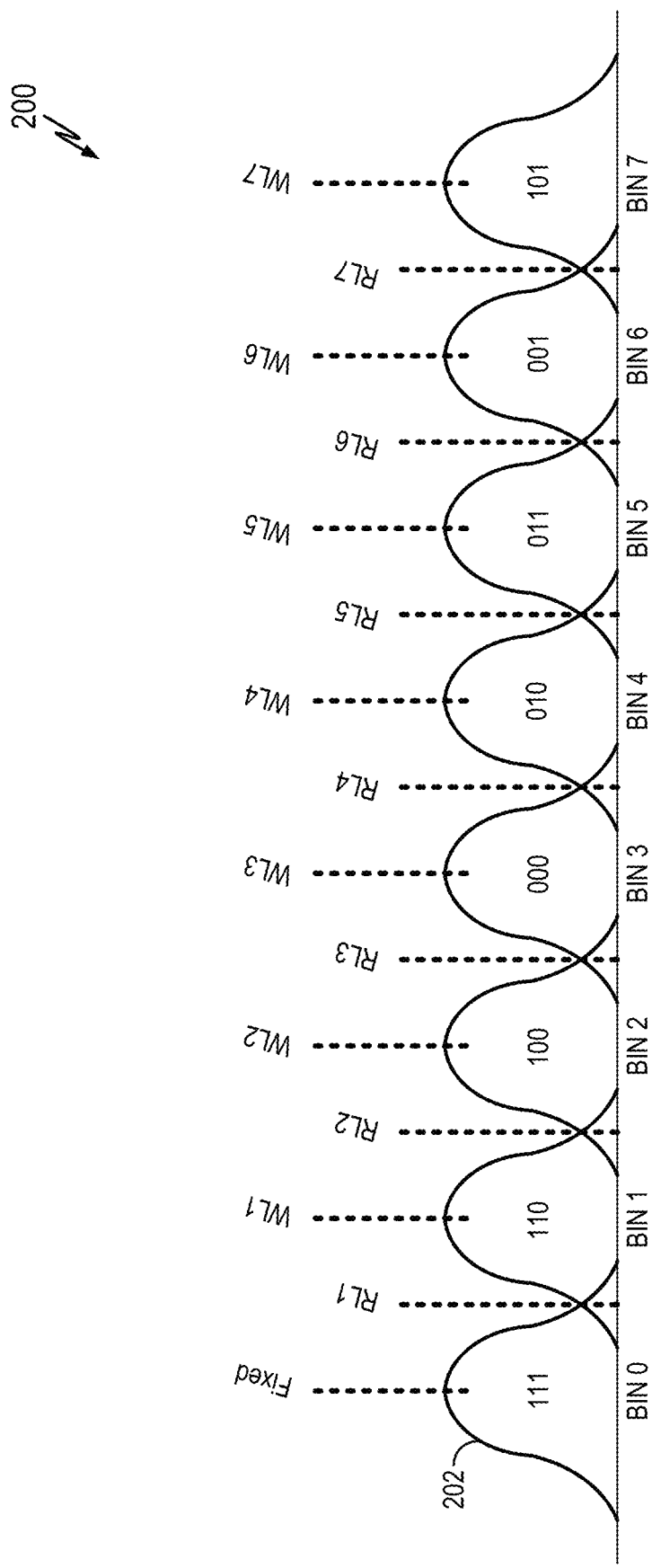
FIG. 2 illustrates an example of programmed voltage level distributions for a cell and associated bins in accordance with one or more aspects of the disclosure.

FIG. 2 illustrates an example of program voltage level distributions 200 for a TLC flash memory cell. A cell can be programmed to any one of eight voltage levels corresponding to, in this example, logical values "111", "110", "100", "000", "010", "011", "001", and "101".

In FIG. 2, eight corresponding program voltage level distributions bins are identified as BIN 0 (i.e., having a distribution 202), BIN 1, BIN 2, BIN 3, BIN 4, BIN 5, BIN 6, and BIN 7. Each of these bins represents a range of threshold voltages to which a memory cell may be programmed for a corresponding logical value. For example, a memory cell having a threshold voltage less than or equal to a read level RL1 voltage may be identified as being in BIN 0. Similarly, a memory cell having a threshold voltage greater than the read level RL1 voltage and less than or equal to a read level RL2 voltage may be identified as being in BIN 1. BIN 2 through BIN 7 are defined in the same manner.

Seven read levels RL1, RL2, RL3, RL4, RL5, RL6, and RL7 are indicated by dashed vertical lines in FIG. 2. These read levels represent the threshold voltage levels that are applied to the memory cell to determine the program level to which the memory cell has been programmed In this example, the read levels are defined at the intersections of the bin distributions. The read levels could be defined at other locations in other implementations.

The portion of a particular bin distribution that cross a read level represents a read error. For example, a memory cell programmed to a level corresponding to the portion of the bin distribution corresponding to logical value "111" that crosses the RL1 read level may be mistakenly read as being part of the bin distribution corresponding to logical value "110."

Also illustrated in FIG. 2 are seven write levels WL1, WL2, WL3, WL4, WL5, WL6, and WL7 indicated by dashed vertical lines. These write levels represent the threshold voltage levels that are applied to the memory cell to program the memory cell to a particular logical value. By adjusting WL1-WL7, the width and spacing of the cell bins can be modified as well as the total voltage range of the NAND cell.

The lowest write level, the erase state, is deemed fixed in this example. Other examples are possible. For example, the fixed write level could instead be the highest write level. Also, the lowest and highest write levels could be adapted in equal but opposite directions.

A given logical value may represent an upper page bit, a middle page bit, and a lower page bit of a logical value stored in a cell programmed to a particular voltage level. For example, in a scenario where the logical values for a cell are based on a Gray code (e.g., as in FIG. 2) to orthogonalize the bits in the cell, the most significant bit of the logical value may correspond to an upper page, the next bit of the logical value may correspond to a middle page, and the least significant bit of the logical value may correspond to a lower page. Thus, for BIN 6, the upper page bit and the middle page bit may be a Gray code logical "0," while the lower page bit may be a Gray code logical "1."

Example Write Level Optimization Operations

Figure 3:
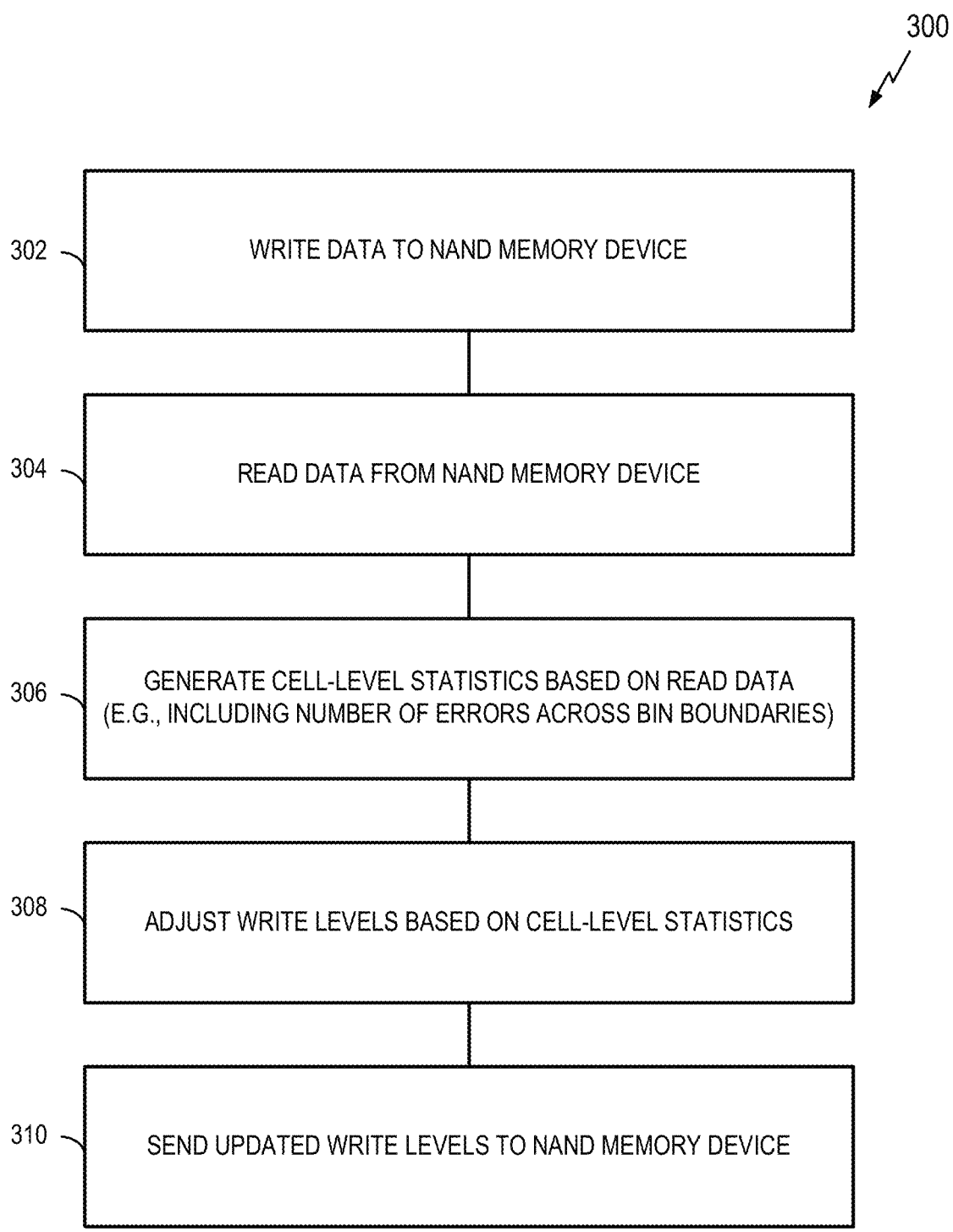
FIG. 3 illustrates an example of operations for optimizing write levels in accordance with one or more aspects of the disclosure.

FIG. 3 illustrates an embodiment of operations 300 that may be performed in conjunction with optimizing write levels as in accordance with the teachings herein. The operations 300 may take place within an SSD storage device, an SSD drive, or some other suitable apparatus or apparatuses. For example, one or more of these operations may be performed by the controller 108 (e.g., the write level update circuit 114) of FIG. 1.

At block 302, a controller (or other suitable apparatus) repeatedly writes data to a NAND memory device. For these write operations, the NAND memory device will use write levels previously provided by the controller to program a NAND array.

At block 304, the controller repeatedly reads data from the NAND memory device. Over time, the controller will typically request a read of different pages of the NAND array.

At block 306, at some point in time (e.g., in response to a trigger), the controller generates cell-level statistics based on at least some of the data read at block 304. As discussed in more detail below in conjunction with FIGS. 8 and 10, these cell-level statistics may indicate the number of errors that occur across bin boundaries (e.g., a bit that was written to one bin is read as being in a neighboring bin). Examples of a trigger that cause the controller to generate cell-level statistics may include, without limitation, a measured temperature reaching a threshold, a program/erase cycle count reaching a threshold, data retention time reaching a threshold, an error rate exceeding a threshold, etc.

At block 308, the controller adjusts the write levels for the NAND memory device based on the cell-level statistics generated at block 306. These operations are described in more detail below in conjunction with FIGS. 4-12.

At block 310, the controller sends the updated write levels to the NAND memory device. The operations 300 will be repeated over time, adjusting the write levels as needed (e.g., whenever a designated condition changes).

Figure 4:
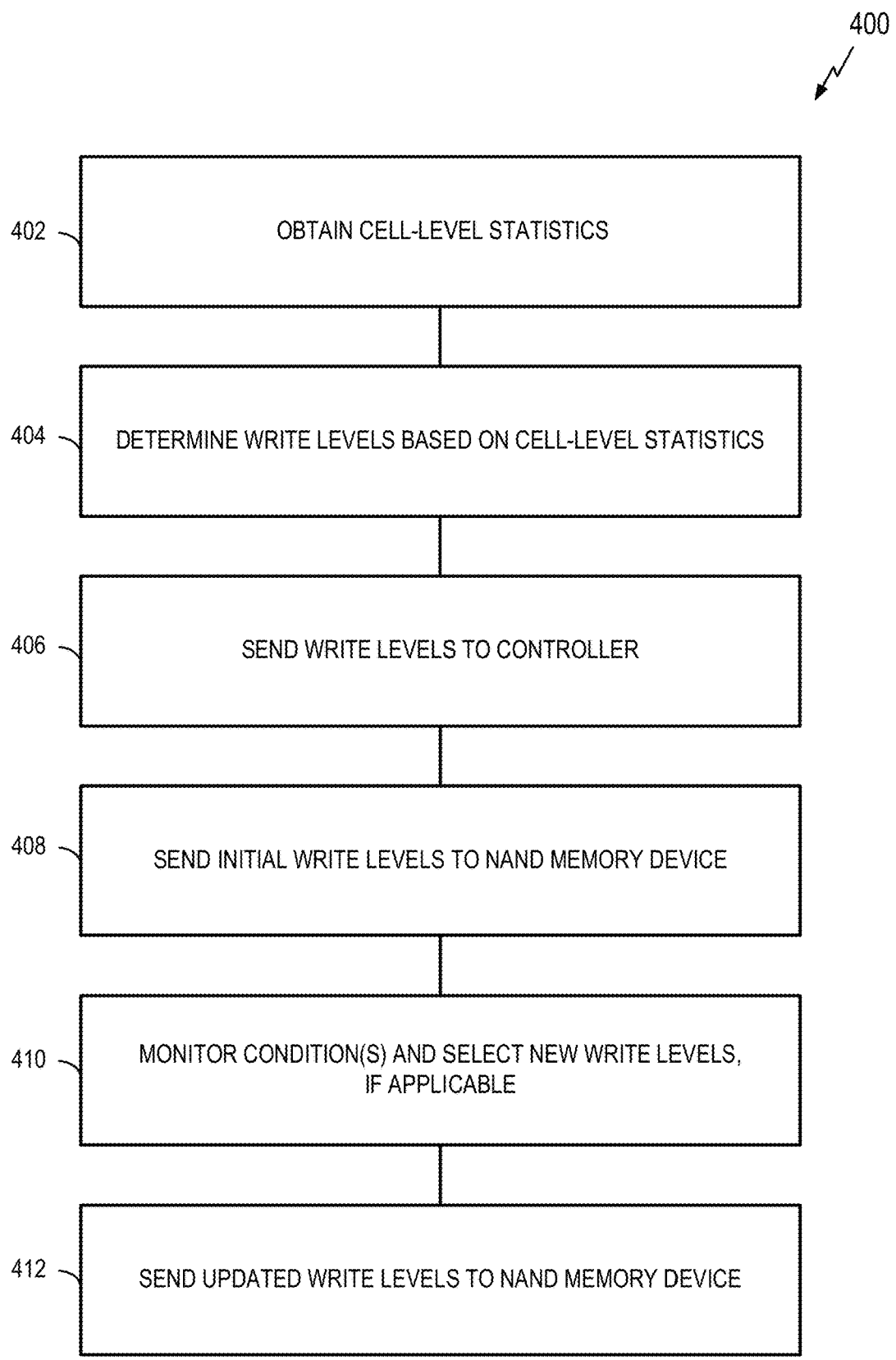
FIG. 4 illustrates an example of operations for optimizing write levels in accordance with one or more aspects of the disclosure.

FIG. 4 illustrates another embodiment of operations 400 that may be performed in conjunction with optimizing write levels as in accordance with the teachings herein. The operations 400 may take place within a programmer device, an SSD storage device, an SSD drive, or some other suitable apparatus or apparatuses. For example, one or more of these operations may be performed by a programmer device at a factory that manufactures an SSD storage device, while other operations may be performed by the controller 108 (e.g., the write level update circuit 114) of FIG. 1.

At block 402, a programmer device (or other suitable apparatus) obtains cell-level statistics for one or more NAND arrays. For example, testing of SSD storage devices (e.g., a batch of devices or a single device) may involve writing and reading the NAND arrays (optionally under different conditions) and collecting statistics based on these reads and writes. As discussed in more detail below in conjunction with FIGS. 8 and 10, these cell-level statistics may indicate the number of errors that occur across bin boundaries (e.g., a bit that was written to one bin is read as being in a neighboring bin).

At block 404, the programmer device determines the write levels to be used for the NAND memory device under different conditions based on the cell-level statistics obtained at block 402. For example, a first set of write levels may be specified for a first condition, a second set of write levels may be specified for a second condition, and so on. These conditions may include, for example, device temperature, device wear (e.g., number of P/E cycles), a retention time (e.g., the amount of time that has elapsed since a cell was programmed), other conditions, or a combination of two or more of these conditions.

At block 406, the programmer device sends the sets of write levels to a controller (or some other device). For example, the programmer device may program a controller of an SSD storage device with these values during testing or manufacture. The write levels may be sent along with an indication of the associated condition(s), if needed.

At block 408, the controller may send an initial set of write levels to the NAND memory device. For example, this set of write levels may have been designated by the programmer device for initial use by the NAND memory device. Alternatively, the NAND memory device may be programmed with this set of write levels in some other way (e.g., during manufacture or testing).

At block 410, the controller monitors conditions associated with the NAND memory device and selects a new set of write values whenever a designated condition has changed (e.g., by a designated amount or to a designated degree). For example, if the controller detects that the temperature in the SSD storage device has exceeded a threshold temperature, the controller may select the set of write values associated with that threshold. As another example, if the number of P/E cycles performed by the NAND memory device exceeds a threshold number of P/E cycles, the controller may select the set of write values associated with that threshold.

At block 412, the controller sends the updated write levels to the NAND memory device. The operations of blocks 410 and 412 will be repeated over time, adjusting the write levels as needed (e.g., whenever a designated condition changes).

Example Write Level Optimization Algorithm

Figure 5:
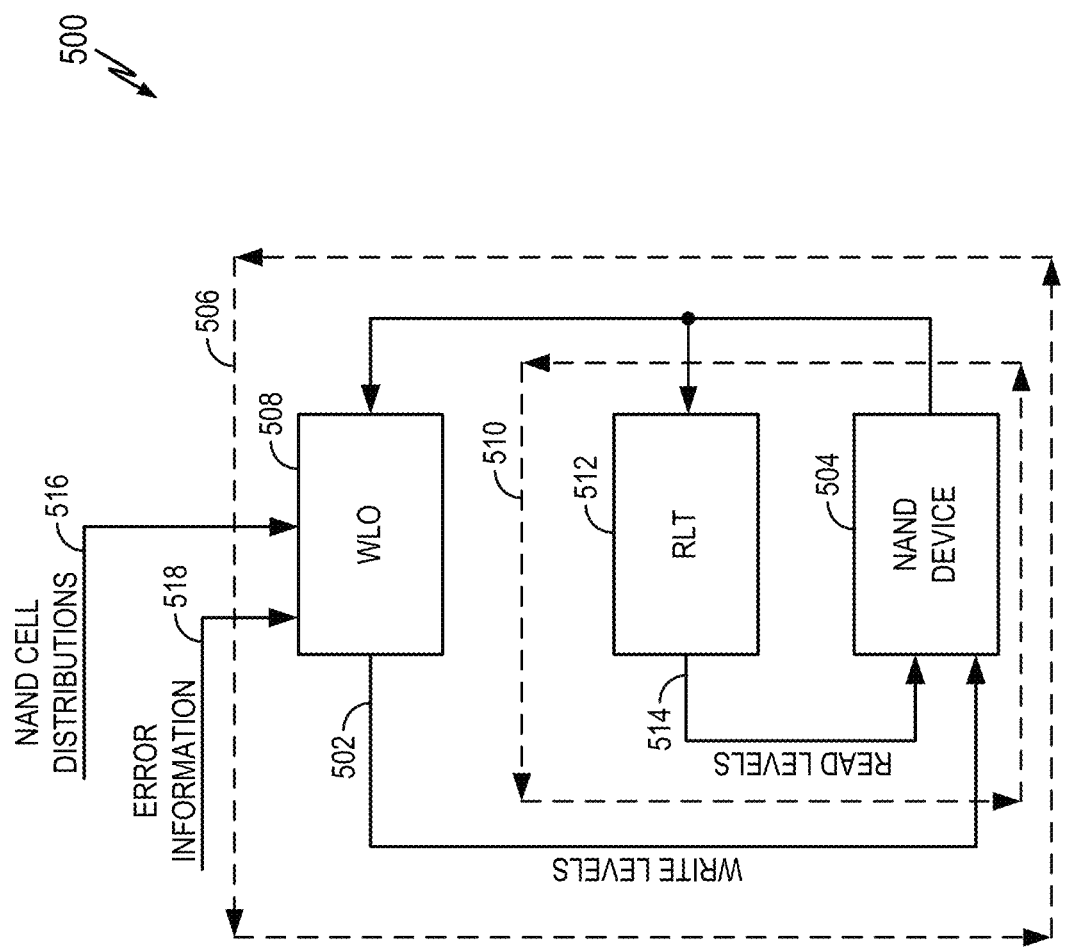
FIG. 5 illustrates an example of an iterative algorithm for optimizing write levels and read levels in accordance with one or more aspects of the disclosure.

FIG. 5 illustrates an embodiment of a system 500 that uses an observable iterative algorithm to set write levels 502 for programming a NAND memory device 504. The system 500 includes an outer loop 506 with write level optimization (WLO) 508 and an inner loop 510 with read level tracking (RLT) 512. It is desirable to optimize the read levels in conjunction with optimizing the write levels so that the best possible read levels are used when reading data for the write level optimization. Typically, the inner loop 510 has faster adaptation than the outer loop 506.

The RLT 512 incrementally moves read levels 514 for reading the NAND memory device 504 to optimal values. For example, the RLT 512 may monitor errors that occur across bin boundaries of cells of the NAND memory device 504 and adjust the read levels 514 to reduce the error rate.

The WLO 508 incrementally moves the write levels 502 to optimal values. For example, the WLO 508 may monitor errors that occur across bin boundaries of cells of the NAND memory device 504 and adjust the write levels 502 to reduce the error rate. In some aspects, the WLO 508 may be based on NAND cell distributions 516 (e.g., approximations of the left and right cell distribution tails). In some aspects, the WLO 508 may be based on error information 518 such as an error proportions target (e.g., to keep the number of error across pages substantially equal). Examples of write level optimization techniques that may be implemented by the WLO 508 are discussed below.

Write Level Optimization Algorithm for a Particular Use Condition

Figure 6:
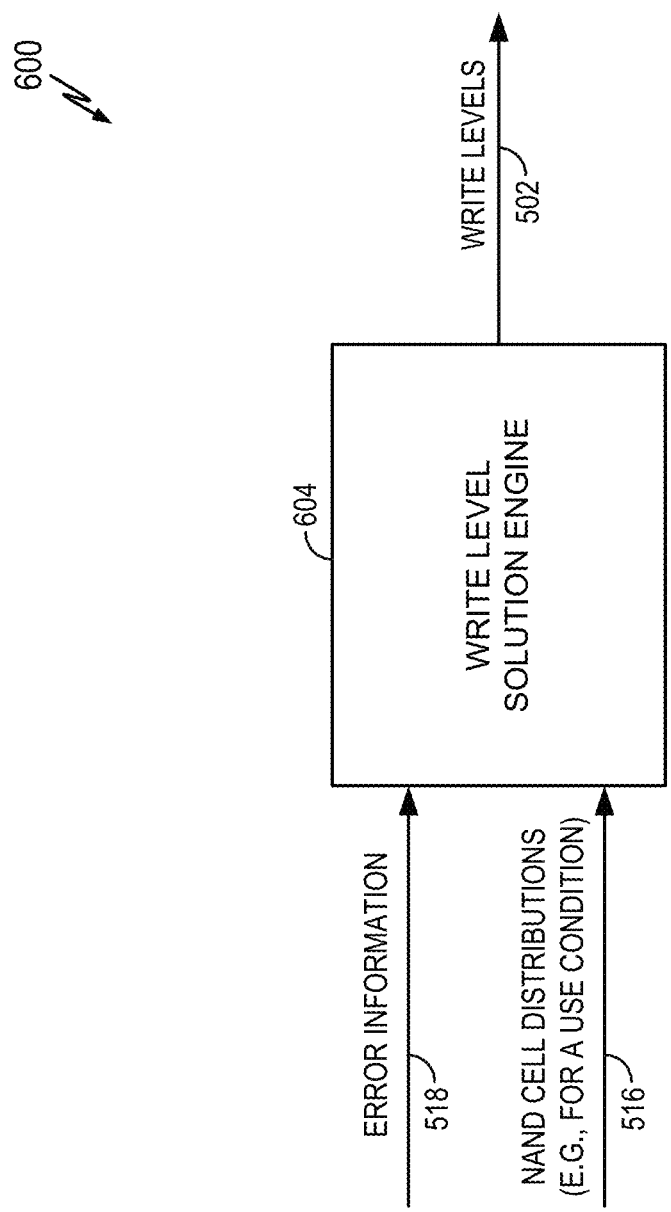
FIG. 6 illustrates an example of a system for optimizing write levels in accordance with one or more aspects of the disclosure.

FIG. 6 illustrates a high level model 600 of the system 500 of FIG. 5 for a particular use condition. The model 600 is represented by a write level solution engine 604 that uses the iterative process of FIG. 5 to generate the write levels 502 (as well as the read levels 514, if desired) based on the error information 518 and the NAND cell distributions 516 (e.g., after several iterations of the nested loops of FIG. 5). Here, the NAND cell distributions 516 correspond to a snapshot model of the NAND device (not shown) for the particular use condition. In some embodiments, the NAND cell distributions 516 are generated by approximating each left and right cell distribution tail with a Gaussian fit. Thus, in some aspects, the write level solution engine 604 may represent the system 500 of FIG. 5 using the Gaussian fit model as an approximation of the NAND. Examples of write level optimization techniques that may be implemented by the write level solution engine 604 (in particular, the WLO 508) are discussed in detail below in conjunction with FIGS. 7-13.

In some aspect, the NAND cell distributions 608 may include bin distribution statistics as taught herein (e.g., in conjunction with FIGS. 7-10). In some aspect, the NAND cell distributions 608 may correspond to at least one use condition. For example, the NAND cell distributions 608 may be for a particular temperature, a particular range of P/E cycles, a particular retention period, etc.

In some aspects, the error information 606 may include an error proportions target (e.g., for a particular Gray code). As discussed below, the error proportions target may be used to keep the number of errors across pages substantially equal. For example, for TLC technology, the write level solution engine 604 uses the error proportions target to keep the number of errors for the upper page, the middle page, and the lower page substantially equal (e.g., a difference of less than 5%).

Example TLC Bin Boundary Errors

Figure 7:
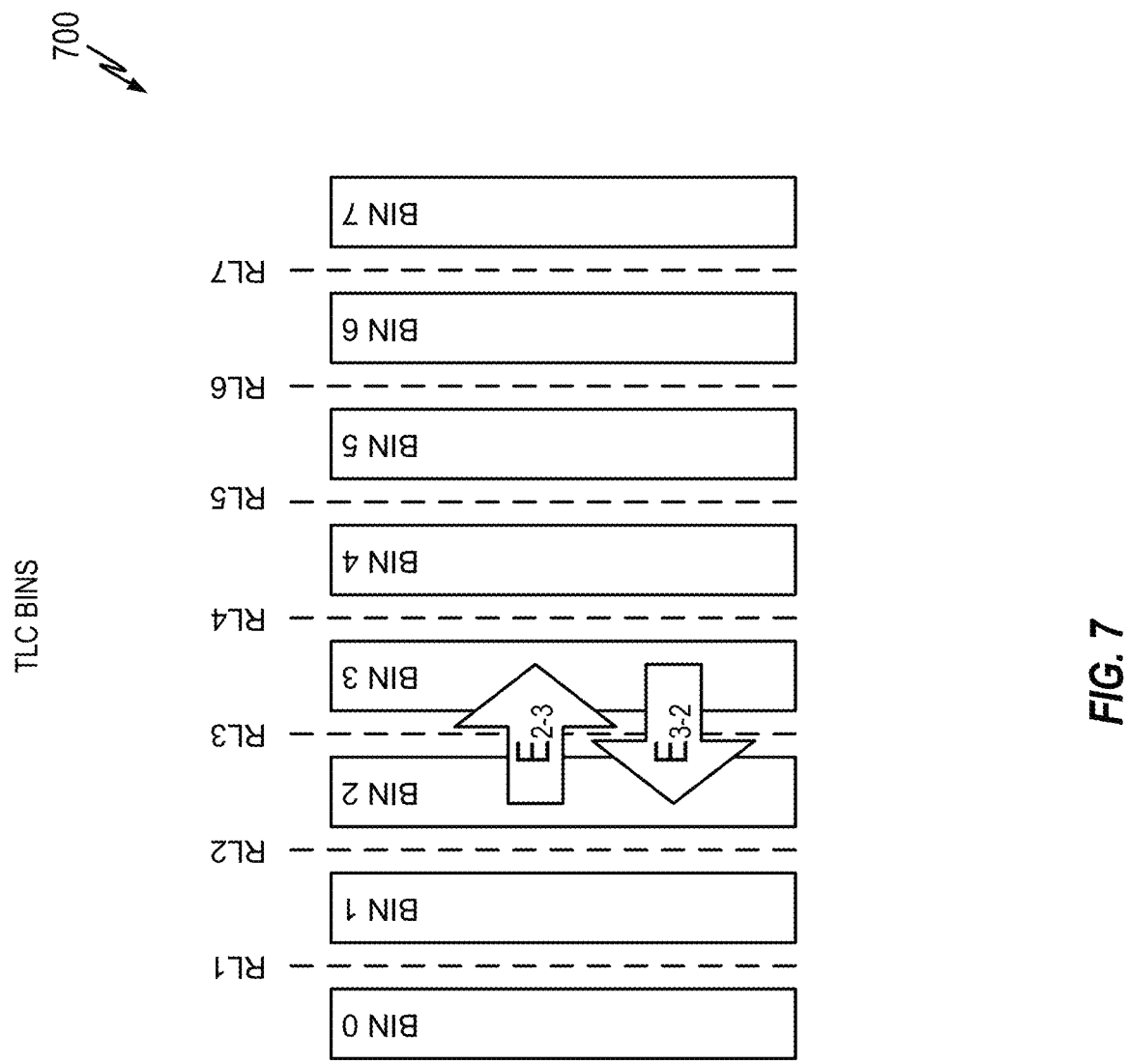
FIG. 7 illustrates an example of errors across bins in accordance with one or more aspects of the disclosure.

In some embodiments, write levels are adjusted based on cell-level statistics (CLS) relating to the number of errors across bin boundaries. For example, generating cell-level statistics may include accumulating the number of errors that shift left across a read threshold boundary and the number of errors that shift right across a read threshold boundary. FIG. 7 illustrates an example of the errors that may be accumulated for an embodiment with eight TLC bins 700 and seven read levels RL1-RL7. For the read level RL3, a first set of accumulated errors $E_{2\text{-}3}$ corresponds to errors where bits written to BIN 2 are read as being from BIN 3 (right shift). Also for the read level RL3, a second set of accumulated errors $E_{3\text{-}2}$ corresponds to errors where bits written to BIN 3 are read as being from BIN 2 (left shift). The cell-level statistics for the TLC bins 700 would also include accumulated error across the other read threshold boundaries (e.g., $E_{0-1}$, $E_{1-0}$, $E_{1-2}$, etc.).

In some embodiments, the basic gradient terms for read level tracking (e.g., the RLT 512 and/or as discussed below) may be based on the natural logarithm of the ratio of errors across a bin boundary. For example, for the read level RL3, the read level gradient term may be calculated as: ln $((1+E_{3-2})/1+E_{2-3}))$.

In some embodiments, the basic gradient terms for write level optimization (e.g., the WLO 508 and/or as discussed below) may be based on the logarithm of the sum of errors across a bin boundary. For example, for the read level RL3, the write level gradient term may be calculated as: log $((E_{3-2}+E_{2-3})/\Sigma bits+R)$. Here, R is an optional regularization constant that compensates (e.g., desensitizes the algorithm) for scenarios where the statistics are bad (e.g., there is a lot of noise or a lot of errors).

In some embodiments, the basic gradient terms may be generated from statistics that are derived based on means and sigmas of the bin information. That is, rather than maintain raw statistics for all of the boundaries, each bin distribution may be represented algorithmically (e.g., as a Gaussian distribution). The errors for each bin may then be calculated, for example, based on the area of the tail of the distribution (e.g., obtained from the Q function for a Gaussian distribution) that crosses a read level.

Example Write Level Optimization Components

Figure 8:
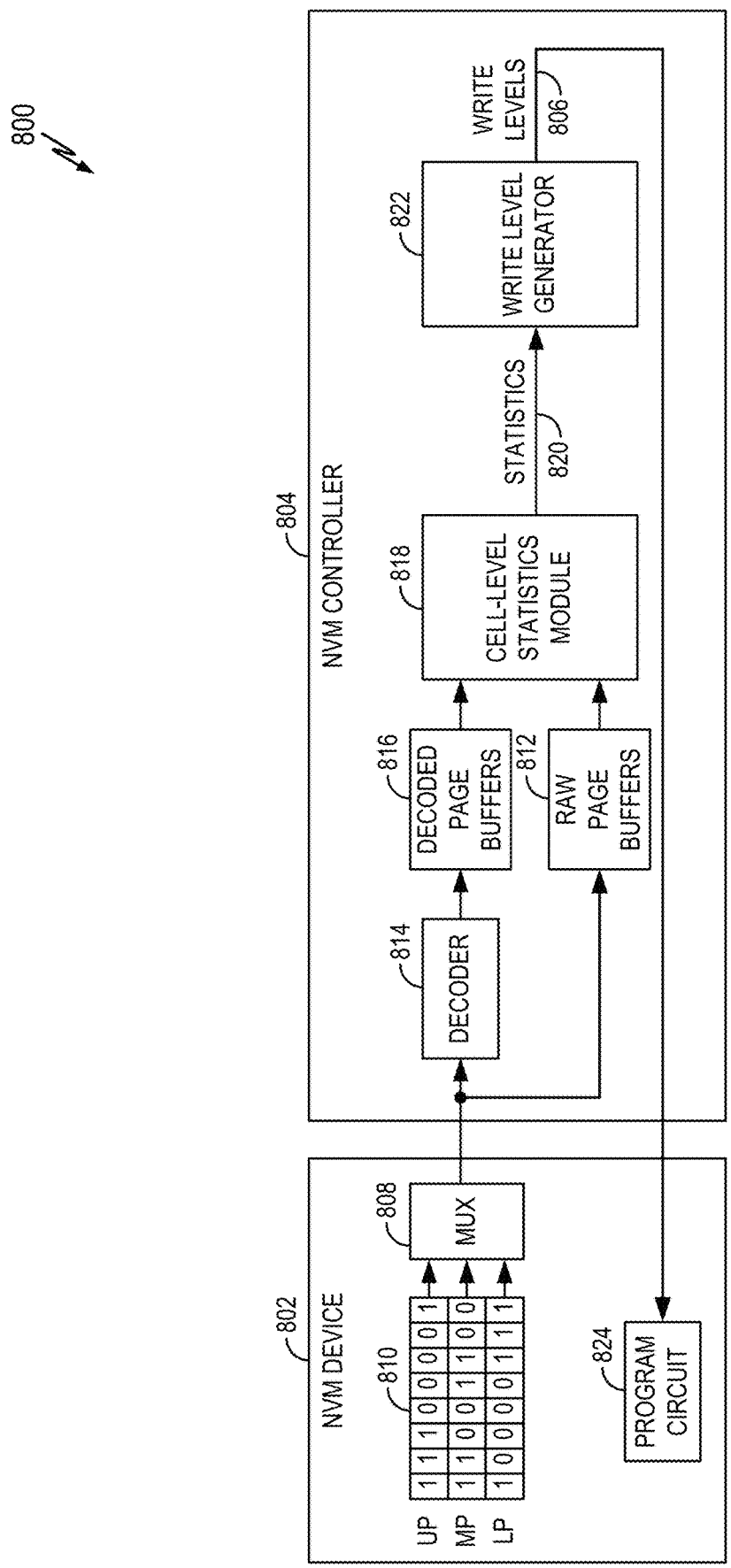
FIG. 8 illustrates an example of memory components including functionality for optimizing write levels in accordance with one or more aspects of the disclosure.

FIG. 8 illustrates an embodiment of a system 800 that includes an NVM device 802 and an NVM controller 804 configured to adjust write levels in accordance with the teachings herein. Briefly, the NVM controller 804 reads raw page data stored in the NVM device 802, updates write levels 806 based on statistics that are accumulated from the page data, and sends the updated write levels 806 to the NVM device 802.

In the example of FIG. 8, the NVM device 802 includes a multiplexer 808 to output a word line of data on a page-by-page basis to the NVM controller 804. For purposes of illustration, FIG. 8 shows data for a cell 810 divided into three pages (e.g., for a TLC implementation). The pages include an upper page (UP), a middle page (MP), and a lower page (LP).

Figure 9:
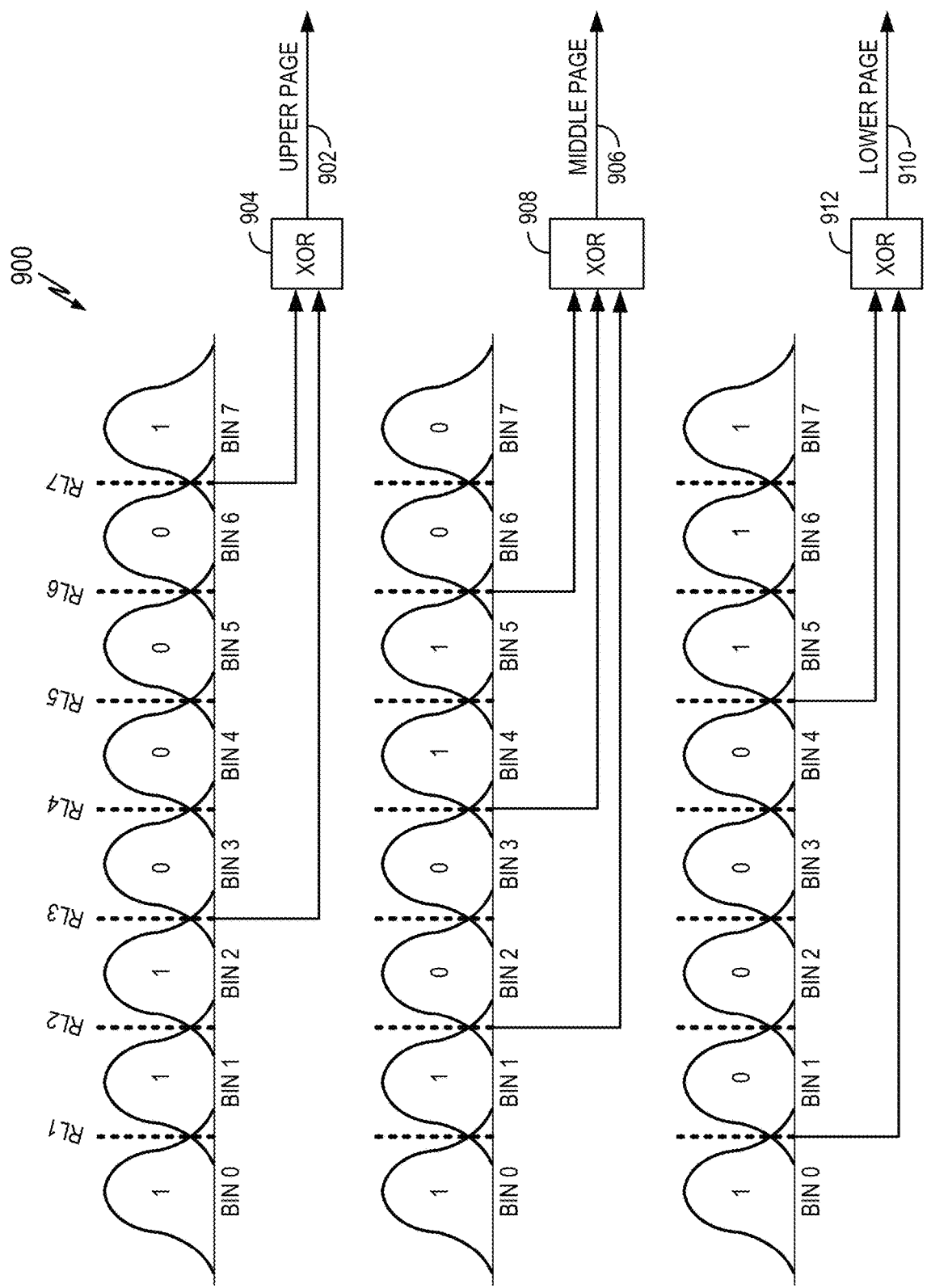
FIG. 9 illustrates an example of programmed voltage level distributions for a cell divided into pages in accordance with one or more aspects of the disclosure.

FIG. 9 illustrates an example of how page data may be read from a cell. The left side of FIG. 9 illustrates program level distributions 900 of TLC memory cells divided into pages according to one example. Each of the program level distributions is shown with the logical data value corresponding to the respective program level distribution for each page.

FIG. 9 also illustrates the read levels (also known as read threshold levels) and logical operations to read out each of the pages from a word line. For example, to read the upper page 902 from a word line, the read levels RL3 and RL7 are applied to the memory cells in the word line and the results are XORed 904 in a logical operation to determine which memory cells in the word line are programmed to a logical "1" data value and which memory cells in the word line are programmed to a logical "0" data value in the upper page. Similarly, the read levels RL2, RL4, and RL6 are used to read out the data values for the middle page 906 of the word line and the results are XORed 908 to determine which memory cells in the word line are programmed to a logical "1" data value and which memory cells in the word line are programmed to a logical "0" data value. Also, the read levels RL1 and RL5 are used to read out the data values for the lower page 910 of the word line and the results are XORed 912 to determine which memory cells in the word line are programmed to a logical "1" data value and which memory cells in the word line are programmed to a logical "0" data value. The assignment of logical data values to the respective program level distributions is based on a configurable Gray coding scheme. The teachings herein are not limited to the Gray coding scheme illustrated in FIG. 9 and may be implemented using other coding schemes.

Referring again to FIG. 8, the NVM controller 804 stores the raw page data it receives from the NVM device 802 in a first set of buffers 812. In addition, the NVM control 804 provides the raw page to a decoder 814 for decoding and the decoded page data is stored in a second set of buffers 816. The decoder 814 may employ an error correction code (ECC) algorithm to decode the raw page data of each page. For example, the decoder 814 may use a low-density parity-check (LDPC) algorithm to decode the raw page data. The decoder 814 may operate as a hard decoder or a soft decoder. Selection logic (not shown) may be used to store the raw page data in the second set of buffers 816 in the event that decoding of one or more of the pages is unsuccessful.

The raw page data buffered in the first set of buffers 812 and the decoded page data buffered in the second set of buffers 816 is provided to a cell-level statistics module 818 for processing. The cell-level statistics module 818 processes the raw page data and the decoded page data to accumulate cell-level statistics 820 (e.g., cell bin boundary error information) that are used by a write level generator 822 to determine gradients for adjusting the write levels 806, as described in more detail below. These updated write levels 806 are sent to the NVM device 802 (e.g., for use by a program circuit 824 that writes data to an NVM array of the NVM device 802).

Example Statistics Collection

Figure 10:
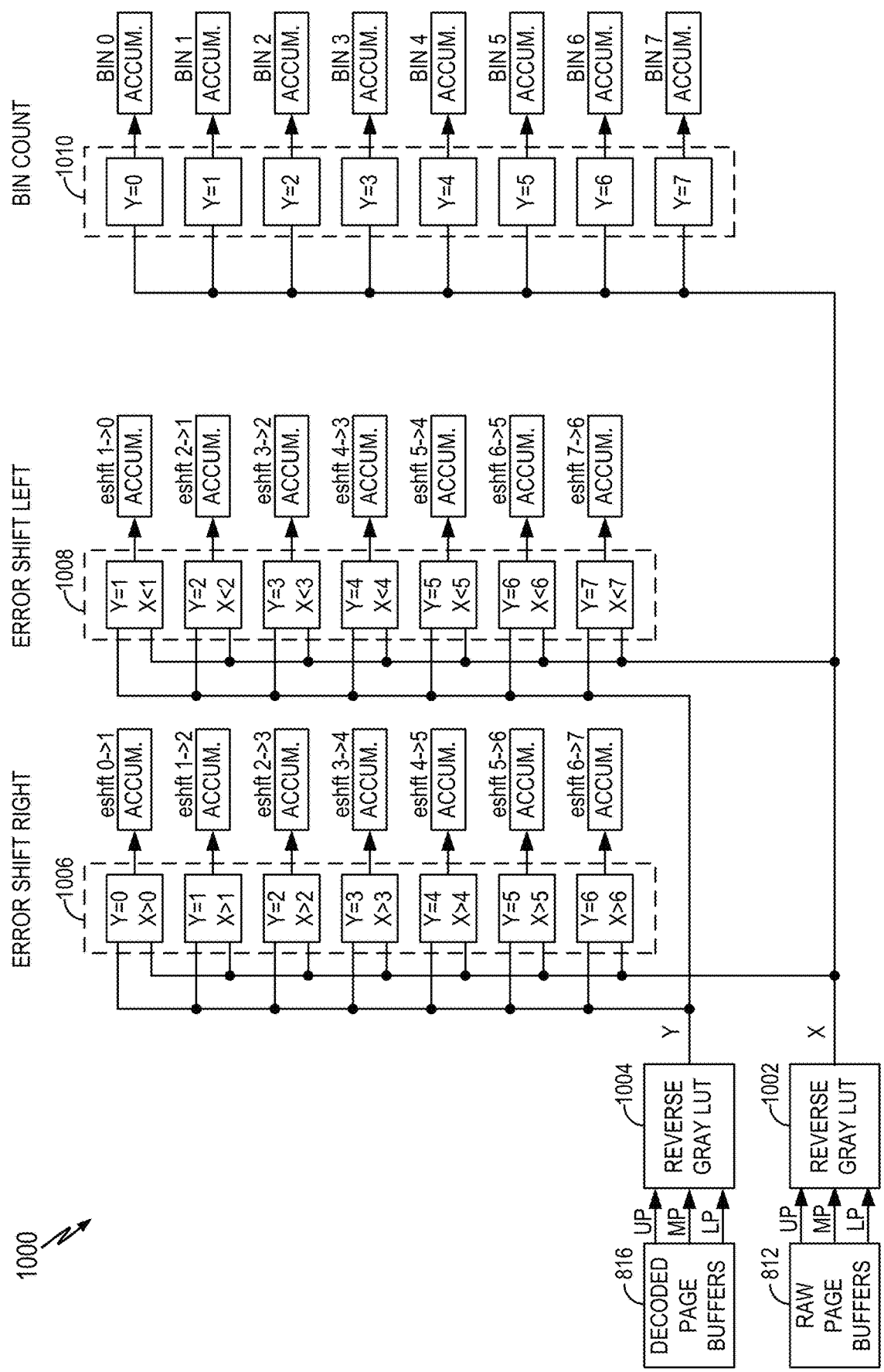
FIG. 10 illustrates an example of statistics collection functionality for optimizing write levels in accordance with one or more aspects of the disclosure.

FIG. 10 illustrates an embodiment of accumulation of cell-level statistics (CLS) 1000 in an NVM controller. With the raw page data loaded into the first set of buffers 812 and the decoded page data loaded into the second set of buffers 816 (see FIG. 8), bin identifiers are identified for each of the memory cells of a word line.

Initially, a first set of bin identifiers is determined for the memory cells of the word line using the raw page data buffered in the first set of buffers 812 and a second set of bin identifiers is determined for the memory cells of the word line using the decoded page data buffered in the second set of buffers 816. Using the data values from each of the upper page, the middle page, and the lower page for a given memory cell, a bin identifier may be identified using a reverse Gray code mapping or look-up table. For example, Table 1 illustrates a reverse Gary code 232 LUT that may be used to identify the bin corresponding to each memory cell based on the data values read from the memory cell for a TLC implementation.

TABLE 1

| U-M-L Data Values | Bin Identifier |
| --- | --- |
| 000 | 3 |
| 001 | 6 |
| 010 | 4 |
| 011 | 5 |
| 100 | 2 |
| 101 | 7 |
| 110 | 1 |
| 111 | 0 |

The teachings herein are not limited to the mapping represented in Table 1. Other Gray code schemes, which generate different mappings, may be used in other implementations. Table 1 may be stored within the NVM controller 804 and may be replaced with other tables if a data storage device is configured to store data according to a different Gray code scheme.

In the example of FIG. 10, a reverse Gray look-up table (LUT) 1002 operates on the raw page data, and a reverse Gray LUT 1004 operates on the decoded page data. As indicated, data values from each of the upper page, the middle page, and the lower page are used to identify a bin identifier for the memory cell using a look-up table. The bin identifier determined based on the raw page data for a given memory cell is indicated as "X" in FIG. 10 and the bin identifier determined based on the decoded page data for the memory cell is indicated as "Y" in FIG. 10. For each of the memory cells in the word line, these two bin identifier values are provide to logic 1006, logic 1008, and logic 1010 to accumulate the cell-level statistics. The logic 1006, the logic 1008, and the logic 1010 may be implemented using hardware logic circuits, software or firmware executed by a processor or group of processors, a combination of the hardware logic circuits and software/firmware, or other logic mechanisms.

The logic 1006 determines the number of read errors resulting from a read level voltage being set below an optimal voltage. Under this condition, a memory cell may be identified as being in a first bin based on the raw page data, but corrected to a lower bin based on the decoded page data. For example, a memory cell may be identified as being programed in bin 1 (i.e., X>0) corresponding to data values of 110 in FIG. 2 based on raw page data read from the word line. After decoding the raw page data, the memory cell may be identified as being in bin 0 (i.e., Y=0) corresponding to data values 111 in FIG. 2. If these conditions are met (X>0 and Y=0), an error shift accumulator eshift 0→1 is incremented. Similarly, an accumulator eshift 1→2 is incremented if X>1 and Y=1, an accumulator eshift 2→3 is incremented if X>2 and Y=2, an accumulator eshift 3→4 is incremented if X>3 and Y=3, an accumulator eshift 4→5 is incremented if X>4 and Y=4, an accumulator eshift 5→6 is incremented if X>5 and Y=5, and an accumulator eshift 6→7 is incremented if X>6 and Y=6.

The logic 1008 determines the number of read errors resulting from a read level voltage being set above an optimal voltage. Under this condition, a memory cell may be identified as being in a first bin based on the raw page data, but corrected to a higher bin based on the decoded page data. For example, a memory cell may be identified as being programed in bin 0 (i.e., X<1) corresponding to data values of 111 in FIG. 2 based on raw page data read from the word line. After decoding the raw page data, the memory cell may be identified as being in bin 1 (i.e., Y=1) corresponding to data values of 110 in FIG. 2. If these conditions are met (X<1 and Y=1), an accumulator eshift 1→0 is incremented. Similarly, an accumulator eshift 2→1 is incremented if X<2 and Y=2, an accumulator eshift 3→2 is incremented if X<3 and Y=3, an accumulator eshift 4→3 is incremented if X<4 and Y=4, an accumulator eshift 5→4 is incremented if X<5 and Y=5, an accumulator eshift 6→5 is incremented if X<6 and Y=6, and an accumulator eshift 7→6 is incremented if X<7 and Y=7.

The logic 1010 determines the number of memory cells identified to be in each of the eight bins. As a memory cell is identified as being in a particular bin, an accumulator corresponding to the bin is incremented. As indicated in FIG. 10, a first accumulator is for bin 0 (Y=0), a second accumulator is for bin 1 (Y=1), a third accumulator is for bin 2 (Y=2), a fourth accumulator is for bin 3 (Y=3), a fifth accumulator is for bin 4 (Y=4), a sixth accumulator is for bin 5 (Y=5), a seventh accumulator is for bin 6 (Y=6), and an eighther accumulator is for bin 7 (Y=7).

Each of the accumulators may be implemented using a multi-bit register (e.g., 32 bits). The accumulators may be reset after processing of a single word line has been completed or may be maintained for the processing of multiple word lines. For example, the cell-level statistics may be accumulated for one or more word lines of a particular block or multiple word lines from different blocks for purposes of adjusting write levels.

Once the cell-level statistics have been accumulated for a word line, or group of word lines, the cell level statistics module 818 (FIG. 8) provides the accumulator values, or access to the respective accumulators, to the write level generator 822 to determine gradients for the write levels 806.

Example Write Level Gradient Generation

The basic error vector generated from the CLS might not be directly usable by the WLO. For example, this error vector may exhibit couplings between the vector elements. Consequently, the gradients represented by the error vector might not be orthogonal to each other. In accordance with the teachings herein, a gradient generator matrix may be used to orthogonalize the gradient vector. The gradient generator matrix is formed from the pseudo inverse of a basic correlation model of the WLO system. The gradient generator matrix can then be used to generate orthogonal gradients that are, in turn, used to adjust all of the write levels simultaneously (except for the static level).

FIG. 11 illustrates an embodiment of a basic correlation model 1100 for write level optimization. The model involves multiplication of a matrix C with a write level gradient vector W to generate an error vector E for the bin boundaries.

The elements of the write level gradient vector W correspond to changes in the write levels. For example, $\Delta W_1$ corresponds to a change in the write level WL1, $\Delta W_2$ corresponds to a change in the write level WL2, and so on.

The first seven elements of the error vector E corresponds to error rates for each of the bin boundaries. For example, log(BND_BER$_1$)*P corresponds to an error rate for bin boundary 0-1, log(BND_BER$_2$)*P corresponds to an error rate for bin boundary 1-2, and so on. The term BND_BER is a shorthand for the logarithm term discussed above (e.g., $(E_{3\text{-}2}+E_{2\text{-}3})/\Sigma bits+R$ for bin boundary 2-3).

The term PAGE_BER_TRGT of the error vector E is a target error rate for a page. The incorporation of this term in the model 1100 serves to provide the smallest voltage range possible for the cell while meeting the error rate target. In general, it is desirable to keep the voltage range as small as possible to increase the usable life of a cell and to reduce programming interference between cells.

The terms $P_1$, $P_2$, etc., are elements of an error proportion vector P. This vector is used to ensure that the error rates for all of the pages (e.g., UP, MP, and LP for TLC) are substantially equal (e.g., exactly equal or equal within a tolerance). For example, for a 232 Gray code, the middle page would ordinarily have a higher error rate than the upper and lower pages assuming that the errors across all of the read levels are the same. The vector P is thus based on the Gray code definition being used. For example, for TLC technology, the vector P may be [2,3,2,3,2,3,2].

The elements of the matrix C represent the effect (positive or negative) that a change in a write level has on the error rate for the bin or bins adjacent that write level. For example, the "−1" term in the first row indicates that an increase in $\Delta W_1$ (e.g., the write level WL1) results in a decrease in the error rate for bin 0, while a decrease in $\Delta W_1$ results in an increase in the error rate for bin 0. As another example, the "1" term in the second row indicates that an increase in $\Delta W_2$ (e.g., the write level WL2) results in an increase in the error rate for bin 0, while a decrease in $\Delta W_2$ results in a decrease in the error rate for bin 0. Also, the "−1" term in the second row indicates that an increase in $\Delta W_2$ results in a decrease in the error rate for bin 1, while a decrease in $\Delta W_2$ results in an increase in the error rate for bin 1. The term a is a cell range adaptation scale (e.g., $0.1 < \alpha <= 1$).

FIG. 12 illustrates an embodiment of a write level gradient generation algorithm 1200. The algorithm 1200 involves multiplication of a matrix $C^+$ with the error vector E to determine the write level gradient vector W. The matrix $C^+$ is the pseudo inverse of the matrix C: $C^+=(C^TC)^{-1}C^T$. Thus, the algorithm 1200 generates a set of write level gradients (e.g., $\Delta W_1$, etc.) based on the accumulated CLS (e.g., $E_{3-2}$, $E_{2-3}$, etc.). Thus, in some aspects, the algorithm 1200 converts the bin error counts to decoupled write level gradients.

Example Write Level Optimization System

Figure 13:
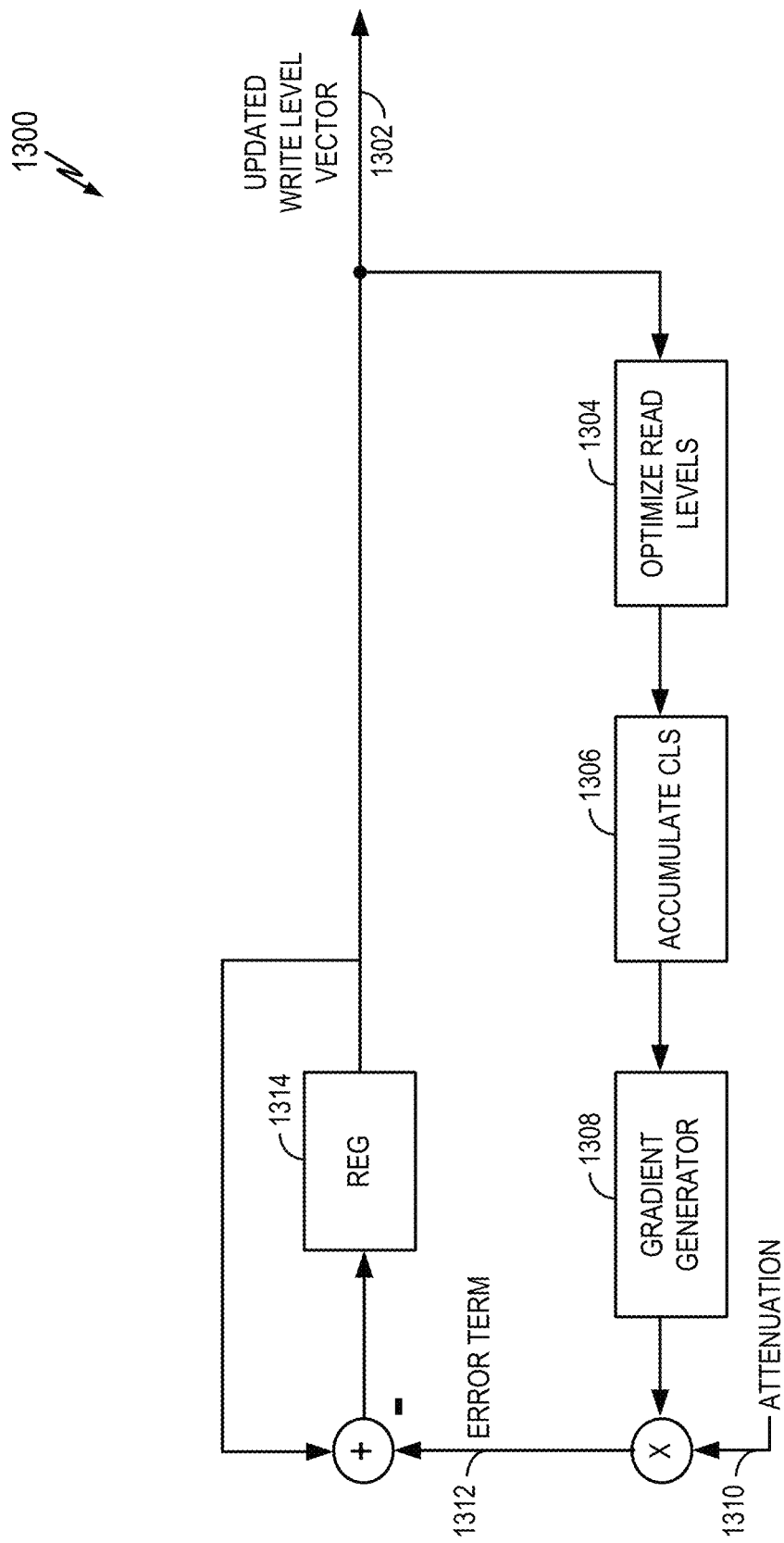
FIG. 13 illustrates an example of a memory system including functionality for optimizing write levels and read levels in accordance with one or more aspects of the disclosure.

FIG. 13 illustrates an iterative WLO loop 1300 for generating an updated write level vector 1302. In a given iteration of the WLO loop, the system optimizes read levels 1304 (e.g., based on writes using the current write level vector), accumulates CLS 1306 (e.g., $E_{3-2}$, $E_{2-3}$, etc.) using the optimized read levels, generates write level gradients (e.g., using the algorithm 1200), and applies attenuation 1310, if applicable, to generate an error term 1312 (e.g., a write level gradient vector). The error term 1312 is subtracted from the current write level vector stored in a register 1314. The output of the register 1314 thus provides the updated write level vector 1302. The WLO loop 1300 may be repeated until the value of the updated write level vector converges (e.g., within a specified tolerance).

Example Data Storage Device

Figure 14:
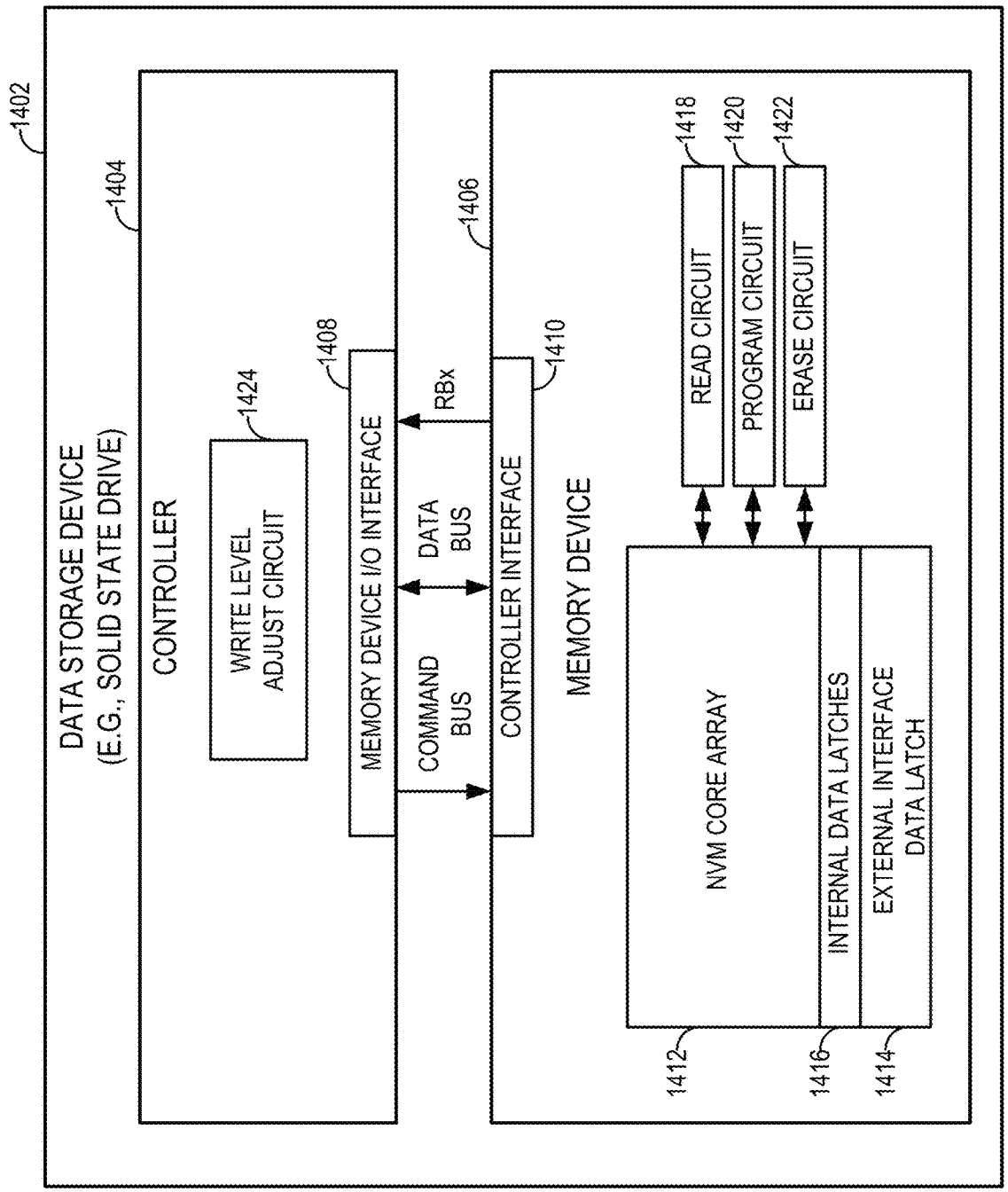
FIG. 14 illustrates an example data storage device (e.g., an SSD storage device) configured in accordance with one or more aspects of the disclosure.

FIG. 14 illustrates an embodiment of a data storage device 1402 (e.g., an SSD drive) that may update write levels as taught herein. The data storage device includes a controller 1404 that writes data to and reads data from a memory device 1406 (e.g., an NVM), and performs other associated data storage operations.

The controller 1404 and the memory device 1406 communicate with one another via corresponding interfaces. The controller 1404 includes a memory device input/output (I/O) interface 1408 for sending commands to the memory device (e.g., via a command bus), sending data to and receiving data from the memory device 1406 (e.g., via a data bus), and for sending and receiving other signaling as applicable (e.g., a read/busy indication (RBx) generated by the memory device 1406). Similarly, the memory device 1406 includes a controller interface 1410 for receiving commands from the controller 1404 (e.g., via a command bus), sending data to and receiving data from the controller 1404 (e.g., via a data bus), and for sending and receiving other signaling as applicable (e.g., RBx).

The memory device 1406 includes an NVM core array 1412 for storing data, an external interface data latch 1414 for outputting stored data to and receiving data to be stored from the controller interface 1410, and a set of internal data latches 1416 for storing operational data that is used by the memory device 1406. The memory device 1406 also includes a read circuit 1418 for reading data from the multi-tier NVM core array 1412, a program circuit 1420 for writing data to the multi-tier NVM core array 1412, and an erase circuit 1422 for erasing data in the multi-tier NVM core array 1412.

In accordance with the teachings herein, the controller 1404 includes a write level adjust circuit 1424 that may be configured to perform one or more of the operations described herein. For example, the write level adjust circuit 1424 may correspond to the write level adjust circuit 114 of FIG. 1 and perform one or more of the write level generation-related operations described herein in conjunction with FIGS. 1-13 and 15-21.

Alternative Write Level Optimization Devices

Figure 15:
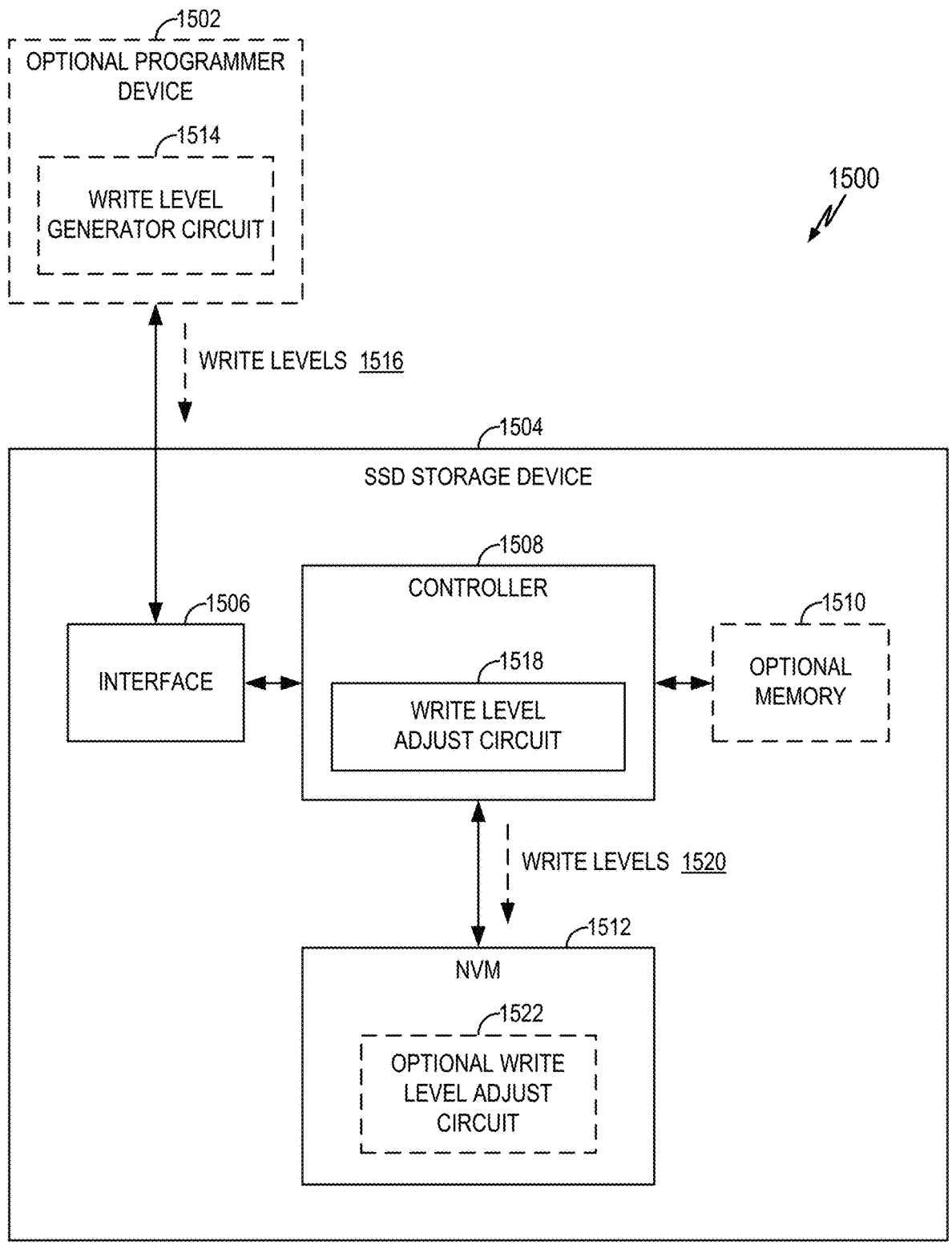
FIG. 15 illustrates an example of different devices for optimizing write levels in accordance with one or more aspects of the disclosure.

The write level optimization operations described herein may be performed by different devices in different implementations. The system 1500 of FIG. 15 depicts an optional programmer device 1502, and an SSD storage device 1504 communicatively coupled to the programmer device 1502. The SSD storage device 1504 includes an interface 1506, a controller 1508, an optional memory 1510, and a non-volatile memory (NVM) 1512.

The programmer device 1502 may be used, for example, during manufacture or test of the SSD storage device 1504. The programmer device 1502 includes a write level generator circuit 1514 for determining write levels 1516 to be used by the SSD storage device 1504 (e.g., the NVM 1512) and sending the write levels 1516 to the SSD storage device 1504. For example, the programmer device 1502 may obtain error information based on data from one or more NVM devices or based on an estimate of such data. As discussed herein, the programmer device 1502 may receive the error information (e.g., from the SSD storage device 1504 and/or at least one other device, not shown in FIG. 15). Alternatively, the programmer device 1504 may receive the data (e.g., from the SSD storage device 1504 and/or at least one other device, not shown in FIG. 15) and generate the error information from the data. The programmer device 1502 may then generate at least one set of write levels 1516 based on the error information. For example, the write level generator circuit 1518 may generate different sets of write levels for different conditions (e.g., temperature, wear, time, etc.).

In an embodiment that includes the programmer device 1502, a write level adjust circuit 1518 of the controller 1508 may select the set of write levels 1520 to be used by the NVM 1512 and send the selected set of write levels 1520 to the NVM 1512. For example, the write level adjust circuit 1518 may select the set of write levels that correspond to a current condition or a set of current conditions (e.g., temperature, number of P/E cycles, retention, etc.).

In some embodiments, the NVM 1512 may include a write level adjust circuit 1522 for determining the write levels to be used by the NVM 1512. For example, the write level adjust circuit 1522 may calculate new write levels in response to a trigger event (e.g., a condition at the NVM 1512). Examples of triggers that cause the NVM 1512 to update the write levels include, without limitation, temperature reaching a threshold, a program/erase cycle count reaching a threshold, data retention time reaching a threshold, an error rate exceeding a threshold, etc. In some embodiments, the NVM 1512 receives the write levels (e.g., different sets of write levels associated with different conditions) from another entity. For example, the NVM 1512 may receive sets of write levels generated by the controller 1508 or the programmer device 1502. In this case, the write level adjust circuit 1522 may select a set of write levels to be used by the NVM 1512 in view of one or more current conditions (e.g., temperature, number of P/E cycles, retention, etc.).

Other Aspects

In view of the above, it should be appreciated that through the use of the teachings herein, optimal write levels may be obtained in a very efficient and practical manner In some aspects, all of the write levels (e.g., except for a static write level) may be adjusted simultaneously (e.g., through the use of the matrix equations described above). In some aspects, all page error rates may be set to be substantially equal (e.g., within ±5%) with respect to one another (e.g., through the use of the error proportion vector). Advantageously, the cell voltage range may be reduced (e g, minimized) while still meeting a page error rate target. By using the lowest cell voltage range possible, the usable life of the NAND device may be extended.

First Example Apparatus

Figure 16:
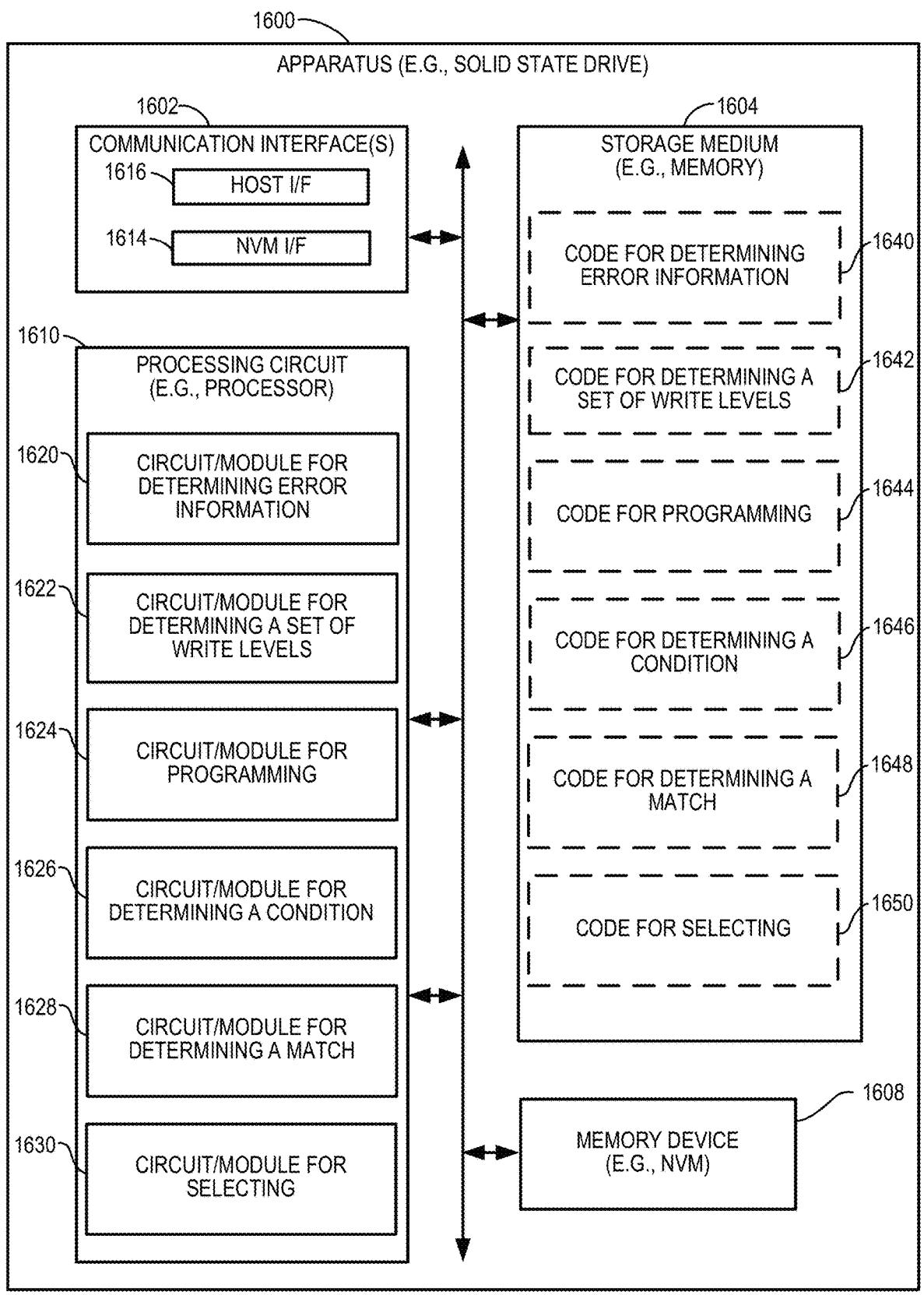
FIG. 16 illustrates an example hardware implementation for an apparatus (e.g., an electronic device) for controlling data storage in accordance with one or more aspects of the disclosure.

FIG. 16 illustrates an embodiment of an apparatus 1600 configured to communicate according to one or more aspects of the disclosure. The apparatus 1600 could embody or be implemented within a memory controller, an SSD storage device, an SSD drive, a host device, an NVM device, a NAND die, or some other type of device that supports data storage. In various implementations, the apparatus 1600 could embody or be implemented within a computing device, a personal computer, a portable device, or workstation, a server, a personal digital assistant, a digital camera, a digital phone, an entertainment device, a medical device, or any other electronic device that stores data.

The apparatus 1600 includes a communication interface 1602, a storage medium 1604, a memory device (e.g., an NVM memory circuit) 1608, and a processing circuit 1610 (e.g., at least one processor and/or other suitable circuitry). These components can be coupled to and/or placed in electrical communication with one another via a signaling bus or other suitable component, represented generally by the connection lines in FIG. 16. The signaling bus may include any number of interconnecting buses and bridges depending on the specific application of the processing circuit 1610 and the overall design constraints. The signaling bus links together various circuits such that each of the communication interface 1602, the storage medium 1604, and the memory device 1608 are coupled to and/or in electrical communication with the processing circuit 1610. The signaling bus may also link various other circuits (not shown) such as timing sources, peripherals, voltage regulators, and power management circuits, which are well known in the art, and therefore, will not be described any further.

The communication interface 1602 provides a means for communicating with other apparatuses over a transmission medium. In some implementations, the communication interface 1602 includes circuitry and/or programming (e.g., a program) adapted to facilitate the communication of information bi-directionally with respect to one or more devices in a system. In some implementations, the communication interface 1602 may be configured for wire-based communication. For example, the communication interface 1602 could be a bus interface, a send/receive interface, or some other type of signal interface including drivers, buffers, or other circuitry for outputting and/or obtaining signals (e.g., outputting signal from and/or receiving signals into an integrated circuit). The communication interface 1602 serves as one example of a means for receiving and/or a means for transmitting.

The memory device 1608 may represent one or more memory devices. As indicated, the memory device 1608 may maintain mapping information 1618 along with other information used by the apparatus 1600. In some implementations, the memory device 1608 and the storage medium 1604 are implemented as a common memory component. The memory device 1608 may also be used for storing data that is manipulated by the processing circuit 1610 or some other component of the apparatus 1600.

The storage medium 1604 may represent one or more computer-readable, machine-readable, and/or processor-readable devices for storing programming, such as processor executable code or instructions (e.g., software, firmware), electronic data, databases, or other digital information. The storage medium 1604 may also be used for storing data that is manipulated by the processing circuit 1610 when executing programming. The storage medium 1604 may be any available media that can be accessed by a general purpose or special purpose processor, including portable or fixed storage devices, optical storage devices, and various other mediums capable of storing, containing or carrying programming.

By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium. For example, the storage medium 1604 may be a non-transitory computer-readable medium storing computer-executable code, including code to perform operations as described herein.

The storage medium 1604 may be coupled to the processing circuit 1610 such that the processing circuit 1610 can read information from, and write information to, the storage medium 1604. That is, the storage medium 1604 can be coupled to the processing circuit 1610 so that the storage medium 1604 is at least accessible by the processing circuit 1610, including examples where at least one storage medium is integral to the processing circuit 1610 and/or examples where at least one storage medium is separate from the processing circuit 1610 (e.g., resident in the apparatus 1600, external to the apparatus 1600, distributed across multiple entities, etc.).

Programming stored by the storage medium 1604, when executed by the processing circuit 1610, causes the processing circuit 1610 to perform one or more of the various functions and/or process operations described herein. For example, the storage medium 1604 may include operations configured for regulating operations at one or more hardware blocks of the processing circuit 1610, as well as to utilize the communication interface 1602 for wireless communication utilizing their respective communication protocols.

The processing circuit 1610 is generally adapted for processing, including the execution of such programming stored on the storage medium 1604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1610 is arranged to obtain, process and/or send data, control data access and storage, issue commands, and control other desired operations. The processing circuit 1610 may include circuitry configured to implement desired programming provided by appropriate media in at least one example. For example, the processing circuit 1610 may be implemented as one or more processors, one or more controllers, and/or other structure configured to execute executable programming Examples of the processing circuit 1610 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1610 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 1610 are for illustration and other suitable configurations within the scope of the disclosure are also contemplated.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform any of the steps, functions, and/or processes described with respect to FIGS. 1-15, 17, and 18. As used herein, the term "adapted" in relation to the processing circuit 1610 may refer to the processing circuit 1610 being one or more of configured, employed, implemented, and/or programmed to perform a particular process, function, operation and/or routine according to various features described herein.

The processing circuit 1610 may be a specialized processor, such as an application-specific integrated circuit (ASIC) that serves as a means for (e.g., structure for) carrying out any one of the operations described in conjunction with FIGS. 1-15, 17, and 18. The processing circuit 1610 serves as one example of a means for sending and/or a means for receiving. In various implementations, the processing circuit 1610 may provide and/or incorporate, at least in part, the functionality described above for the controller 108 or the SSD storage device 104 of FIG. 1 or the controller 1408 or the programmer device 1402 of FIG. 14.

According to at least one example of the apparatus 1600, the processing circuit 1610 may include one or more of a circuit/module for determining error information 1620, a circuit/module for determining a set of write levels 1622, a circuit/module for programming 1624, a circuit/module for determining a condition 1626, a circuit/module for determining a match 1628, or a circuit/module for selecting 1630. In various implementations, the circuit/module for determining error information 1620, the circuit/module for determining a set of write levels 1622, the circuit/module for programming 1624, the circuit/module for determining a condition 1626, the circuit/module for determining a match 1628, or the circuit/module for selecting 1630 may provide and/or incorporate, at least in part, the functionality described above for the controller 108 of FIG. 1 or the controller 504 of FIG. 5.

As mentioned above, a program stored by the storage medium 1604, when executed by the processing circuit 1610, causes the processing circuit 1610 to perform one or more of the various functions and/or process operations described herein. For example, the program may cause the processing circuit 1610 to perform the various functions, steps, and/or processes described herein with respect to FIGS. 1-15, 17, and 18 in various implementations. As shown in FIG. 16, the storage medium 1604 may include one or more of code for determining error information 1640, code for determining a set of write levels 1642, code for programming 1644, code for determining a condition 1646, code for determining a match 1648, or code for selecting 1650. In various implementations, the code for determining error information 1640, the code for determining a set of write levels 1642, the code for programming 1644, the code for determining a condition 1646, code for determining a match 1648, or the code for selecting 1650 may be executed or otherwise used to provide the functionality described herein for the circuit/module for determining error information 1620, the circuit/module for determining a set of write levels 1622, the circuit/module for programming 1624, the circuit/module for determining a condition 1626, the circuit/module for determining a match 1628, or the circuit/module for selecting 1630.

First Example Process

Figure 17:
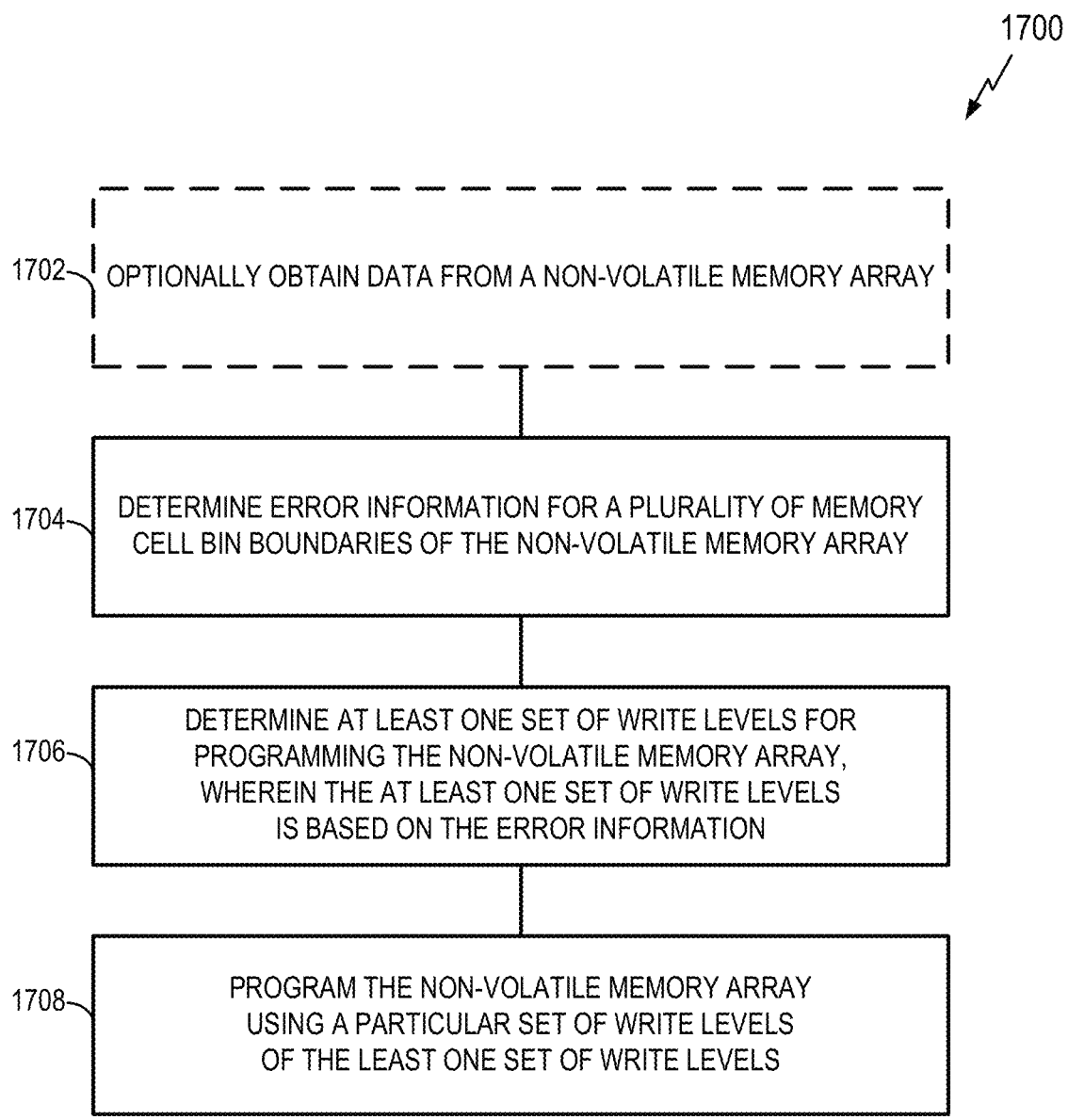
FIG. 17 illustrates an example process for determining write levels in accordance with one or more aspects of the disclosure.

FIG. 17 illustrates a process 1700 for communication in accordance with some aspects of the disclosure. The process 1700 may take place within a processing circuit (e.g., the processing circuit 1610 of FIG. 16), which may be located in a controller, an SSD storage device, an SSD drive, a host device, an NVM device, a NAND die, or some other suitable apparatus. Of course, in various aspects within the scope of the disclosure, the process 1700 may be implemented by any suitable apparatus capable of supporting memory-related operations.

At optional block 1702, an apparatus (e.g., a solid state drive) may obtain data from a non-volatile memory array (e.g., an array of an NVM device of a solid state drive).

At block 1704, the apparatus determines error information for a plurality of memory cell bin boundaries of a non-volatile memory array. In some embodiment, the determination of the error information is based on the data obtained at block 1702. For example, a controller of a solid state drive may receive data from an NVM device of the solid state drive and collect statistics based on the data as taught herein to generate the error information. In some aspects, a first boundary of the plurality of memory cell bin boundaries is between a first bin and a second bin adjacent the first bin; a subset of the error information for the first boundary may include a first count of data bits written in error to the first bin instead of the second bin; and the subset of error information further may include a second count of data bits written in error to the second bin instead of the first bin.

At block 1706, the apparatus determines at least one set of write levels for programming the non-volatile memory array, wherein the at least one set of write levels is based on the error information. In some aspects, the determination of the at least one set of write levels may include generating the write levels. For example, a controller of a solid state drive may perform an iterative algorithm on the error information as taught herein to generate the write levels. In some aspects, determination of the at least one set of write levels may include: outputting the error information; and receiving the at least one set of write levels. For example, a controller may send the error information to another device (e.g., e.g., a programmer device) and receive write levels based on that error information from the other device.

In some aspects, the determination of the error information and the determination of the at least one set of write levels, may include: generating write level gradients based on the error information; updating a set of read levels for reading the non-volatile memory array; and updating the error information. In some aspects, the generation of the write level gradients may include simultaneously generating: a first gradient of the write level gradients for a first bin boundary of the plurality of memory cell bin boundaries; and a second gradient of the write level gradients for a second bin boundary of the plurality of memory cell bin boundaries. In some aspects, the first gradient is orthogonal to the second gradient.

In some aspects, the at least one set of write levels may include a plurality of sets of write levels; and each set of the plurality of sets is associated with a corresponding condition of a plurality of conditions defined for the non-volatile memory array.

In some aspects, the determination of the at least one set of write levels may include: obtaining inputs for a matrix algorithm; and iteratively invoking the matrix algorithm in conjunction with updating the first count and the second count. In some aspects, the inputs may include: a target error rate, error proportion information, cell range information, a correlation model, or any combination thereof. In some aspects, the inputs may include a target error rate for a page of the non-volatile memory array; and the iterative invocation of the matrix algorithm sets a cell voltage range for writes to the page according to the target error rate. In some aspects, the inputs may include a correlation model for different Gray code pages of the non-volatile memory array; and the iterative invocation of the matrix algorithm sets a first error rate for a first page of the Gray code pages to be substantially equal to a second error rate for a second page of the Gray code pages.

At block 1708, the apparatus programs the non-volatile memory array using a particular set of write levels of the least one set of write levels. For example, an NVM device of a solid state drive may use a set of write levels received from a controller of the solid state drive to perform a write to an NVM array of the NVM device. As another example, a controller of a solid state drive may send a set of write levels to an NVM device of the solid stare drive, and subsequently issue a write command to the NVM device.

In some aspects, the process 1700 may involve generating a set of write levels based on a number of possible future conditions (e.g., that might not be present at the moment error statistics are collected from the NVM device). In some scenarios, error statistics collected from the NVM device may be taken into account to determine corrections relative to the current condition of the NVM device and its current write levels. For example, in some aspects, the determination of the at least one set of write levels may include: generating a first set of write levels for a first future condition; and generating a second set of write levels for a second future condition. In this case, the determination of the error information may include determining current error information for a current condition; while the determination of the at least one set of write levels may further include adjusting the first set of write levels and the second set of write levels based on the current error information.

In some aspects, a process in accordance with the teachings herein may include any combination of the above operations.

Second Example Process

Figure 18:
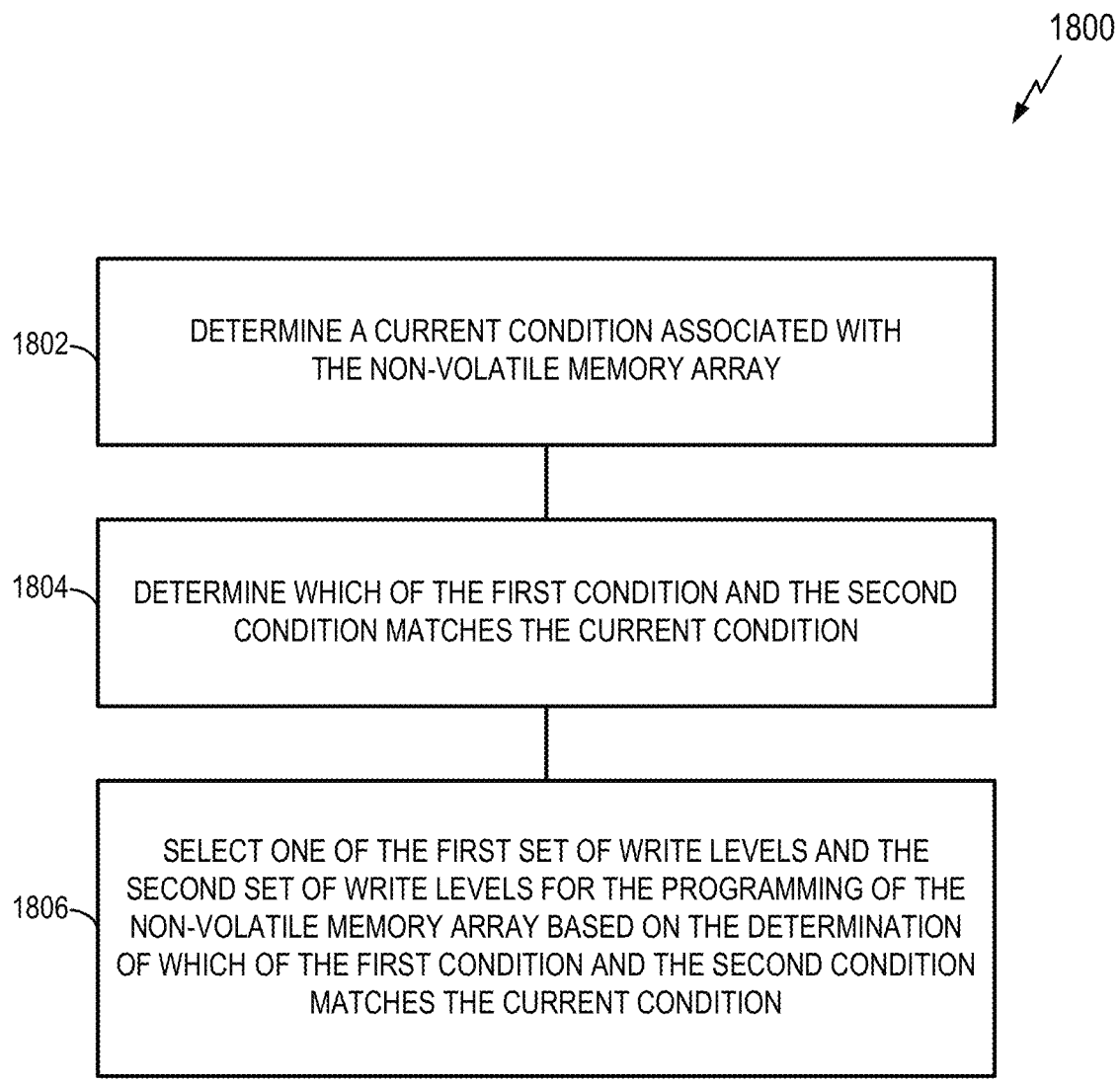
FIG. 18 illustrates an example process for determining write levels in accordance with one or more aspects of the disclosure.

FIG. 18 illustrates a process 1800 for communication in accordance with some aspects of the disclosure. One or more aspects of the process 1800 may be used in conjunction with (e.g., in addition to or as part of) the process 1700 of FIG. 17. The process 1800 may take place within a processing circuit (e.g., the processing circuit 1610 of FIG. 16), which may be located in a controller, an SSD storage device, an SSD drive, an NVM device, a NAND die, a host device, or some other suitable apparatus. Of course, in various aspects within the scope of the disclosure, the process 1800 may be implemented by any suitable apparatus capable of supporting memory-related operations.

In some aspects, the process 1800 may be for determining at least one set of write levels. In some aspects, the at least one set of write levels may include: a first set of write levels for a first condition; and a second set of write levels for a second condition. In some aspects, the first condition may include: a first temperature, a first non-volatile memory wear condition, a first data retention condition, or any combination thereof; and the second condition may include: a second temperature, a second non-volatile memory wear condition, a second data retention condition, or any combination thereof.

At block 1802, an apparatus (e.g., a controller of a solid state drive) determines a current condition associated with the non-volatile memory array.

At block 1804, the apparatus determines which of the first condition and the second condition matches the current condition.

At block 1806, the apparatus selects one of the first set of write levels and the second set of write levels for the programming of the non-volatile memory array based on the determination of which of the first condition and the second condition matches the current condition.

In some aspects, a process in accordance with the teachings herein may include any combination of the above operations.

Second Example Apparatus

Figure 19:
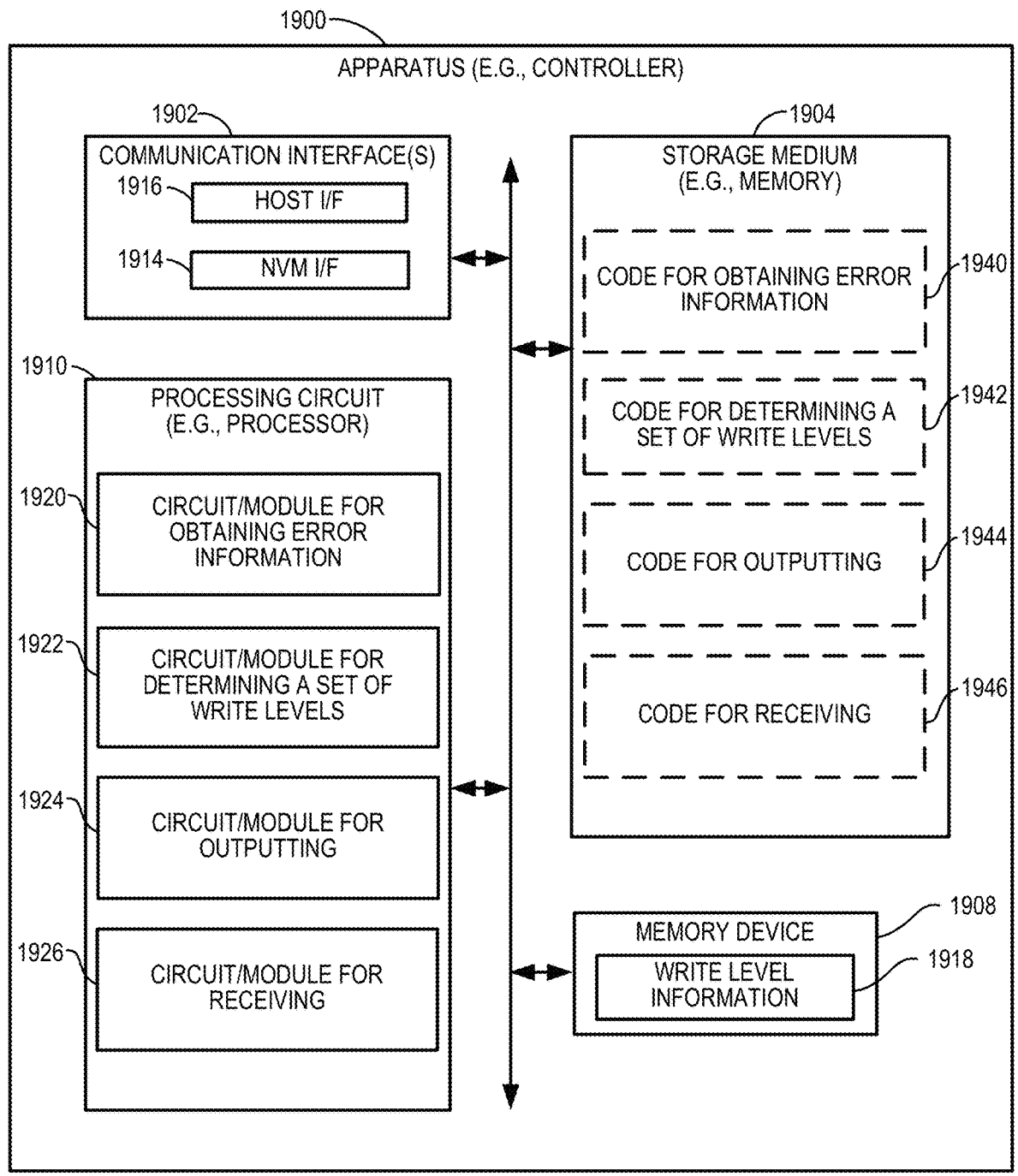
FIG. 19 illustrates an example hardware implementation for an apparatus (e.g., an electronic device) for storing data in accordance with one or more aspects of the disclosure.

FIG. 19 illustrates an embodiment of an apparatus 1900 configured to communicate according to one or more aspects of the disclosure. The apparatus 1900 could embody or be implemented within an SSD storage device, an SSD drive, a programmer device, or some other type of device that stores data. In various implementations, the apparatus 1900 could embody or be implemented within a computing device, a personal computer, a portable device, or workstation, a server, a personal digital assistant, a digital camera, a digital phone, an entertainment device, a medical device, or any other electronic device that stores data.

The apparatus 1900 includes a communication interface 1902, a storage medium 1904, a user interface 1906, a memory device 1908 (e.g., storing write level information 1918), and a processing circuit 1910 (e.g., at least one processor and/or other suitable circuitry). In various implementations, the user interface 1906 may include one or more of: a keypad, a display, a speaker, a microphone, a touchscreen display, of some other circuitry for receiving an input from or sending an output to a user. The communication interface 1902 may be coupled to one or more antennas 1912, and may include a transmitter 1914 and a receiver 1916. In general, the components of FIG. 19 may be similar to corresponding components of the apparatus 1600 of FIG. 16.

According to one or more aspects of the disclosure, the processing circuit 1910 may be adapted to perform any or all of the features, processes, functions, operations and/or routines for any or all of the apparatuses described herein. For example, the processing circuit 1910 may be configured to perform any of the steps, functions, and/or processes described with respect to FIGS. 1-15, 20, and 21. As used herein, the term "adapted" in relation to the processing circuit 1910 may refer to the processing circuit 1910 being one or more of configured, used, implemented, and/or programmed to perform a particular process, function, operation and/or routine according to various features described herein.

The processing circuit 1910 may be a specialized processor, such as an application-specific integrated circuit (ASIC) that serves as a means for (e.g., structure for) carrying out any one of the operations described in conjunction with FIGS. 1-15, 20, and 21. The processing circuit 1910 serves as one example of a means for sending and/or a means for receiving. In various implementations, the processing circuit 1910 may provide and/or incorporate, at least in part, the functionality described above for the controller 108 or the SSD storage device 104 of FIG. 1 or the controller 1408 or the programmer device 1402 of FIG. 14.

According to at least one example of the apparatus 1900, the processing circuit 1910 may include one or more of a circuit/module for obtaining error information 1920, a circuit/module for determining a set of write values 1922, a circuit/module for outputting 1924, or a circuit/module for receiving 1926. In various implementations, the circuit/module for obtaining error information 1920, the circuit/module for determining a set of write values 1922, the circuit/module for outputting 1924, or the circuit/module for receiving 1926 may provide and/or incorporate, at least in part, the functionality described above for the controller 108 or the SSD storage device 104 of FIG. 1 or the controller 1408 or the programmer device 1402 of FIG. 14.

As mentioned above, programming stored by the storage medium 1904, when executed by the processing circuit 1910, causes the processing circuit 1910 to perform one or more of the various functions and/or process operations described herein. For example, the programming may cause the processing circuit 1910 to perform the various functions, steps, and/or processes described herein with respect to FIGS. 1-15, 20, and 21 in various implementations. As shown in FIG. 19, the storage medium 1904 may include one or more of code for obtaining error information 1940, code for determining a set of write values 1942, code for outputting 1944, or code for receiving 1946. In various implementations, the code for obtaining error information 1940, the code for determining a set of write values 1942, the code for outputting 1944, or the code for receiving 1946 may be executed or otherwise used to provide the functionality described herein for the circuit/module for obtaining error information 1920, the circuit/module for determining a set of write values 1922, the circuit/module for outputting 1924, or the circuit/module for receiving 1926.

Third Example Process

Figure 20:
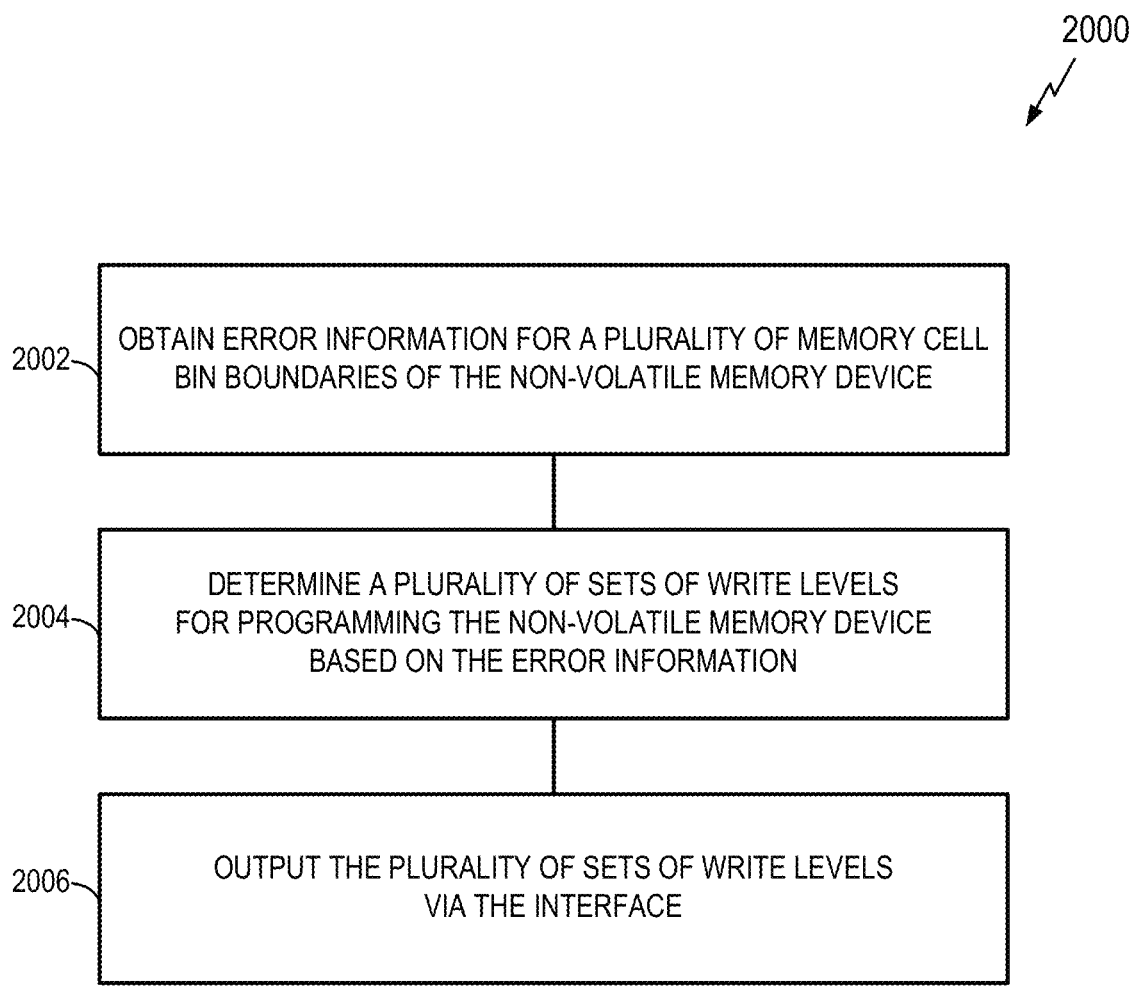
FIG. 20 illustrates an example process for determining write levels in accordance with one or more aspects of the disclosure.

FIG. 20 illustrates a process 2000 for communication in accordance with some aspects of the disclosure. The process 2000 may take place within a processing circuit (e.g., the processing circuit 1910 of FIG. 19), which may be located in a controller, an SSD storage device, an SSD drive, a programmer device, a host device, or some other suitable apparatus. Of course, in various aspects within the scope of the disclosure, the process 2000 may be implemented by any suitable apparatus capable of supporting memory-related operations.

At block 2002, an apparatus (e.g., a programmer device, or a controller of a solid state drive) obtains (e.g., receives or generates) error information for a plurality of memory cell bin boundaries of a non-volatile memory device. In some aspects, the error information may be for a particular memory use condition (e.g., temperature, wear, retention, etc.). In some aspects, the obtaining of the error information may include generating the error information. In some aspects, the obtaining of the error information may include receiving the error information.

At block 2004, the apparatus determines a plurality of sets of write levels for programming the non-volatile memory device based on the error information. In some aspects, obtaining the error information at block 2002 and determining the plurality of sets of write levels at block 2004, may include iteratively: generating write level gradients based on the error information; and updating the error information.

In some aspects, the determination of the plurality of sets of write levels may include: generating a first set of the plurality of sets for a first condition; and generating a second set of the plurality of sets for a second condition. In some aspects, the first condition may include a first temperature; and the second condition may include a second temperature. In some aspects, the first condition may include a first non-volatile memory wear condition; and the second condition may include a second non-volatile memory wear condition. In some aspects, the first condition may include a first data retention condition; and the second condition may include a second data retention condition.

In some aspects, the determination of the plurality of sets of write levels may include: obtaining inputs for a matrix algorithm; and iteratively invoking the matrix algorithm. In some aspects, the inputs may include: a target error rate, error proportion information, cell range information, and a correlation model. In some aspects, the matrix algorithm may include: multiplying the error information for the plurality of memory cell bin boundaries with the error proportion information to generate a first vector; calculating a logarithm of each element of the first vector to generate a second vector; generating a pseudo inverse matrix from the correlation model; and multiplying the second vector with the pseudo inverse matrix. In some aspects, the target error rate is for a particular page of the non-volatile memory device; the iterative invocation of the matrix algorithm sets a cell voltage range for writes to the particular page according to the target error rate; the correlation model is for different Gray code pages of the non-volatile memory device; and the iterative invocation of the matrix algorithm sets a first error rate for a first page of the Gray code pages to be substantially equal to a second error rate for a second page of the Gray code pages.

In some aspects, the determination of the plurality of sets of write levels may include: generating a first set of the plurality of sets for a first condition; and generating a second set of the plurality of sets for a second condition. In some aspects, the first condition may include: a first temperature, a first non-volatile memory wear condition, a first data retention condition, or any combination thereof; and the second condition may include: a second temperature, a second non-volatile memory wear condition, a second data retention condition, or any combination thereof.

At block 2006, the apparatus outputs the plurality of sets of write levels via the interface. For example, a programmer device may send the write levels to a controller of a solid state drive. As another example, a controller of a solid state drive may send the write levels to an NVM device of the solid state drive.

In some aspects, a process in accordance with the teachings herein may include any combination of the above operations.

Fourth Example Process

Figure 21:
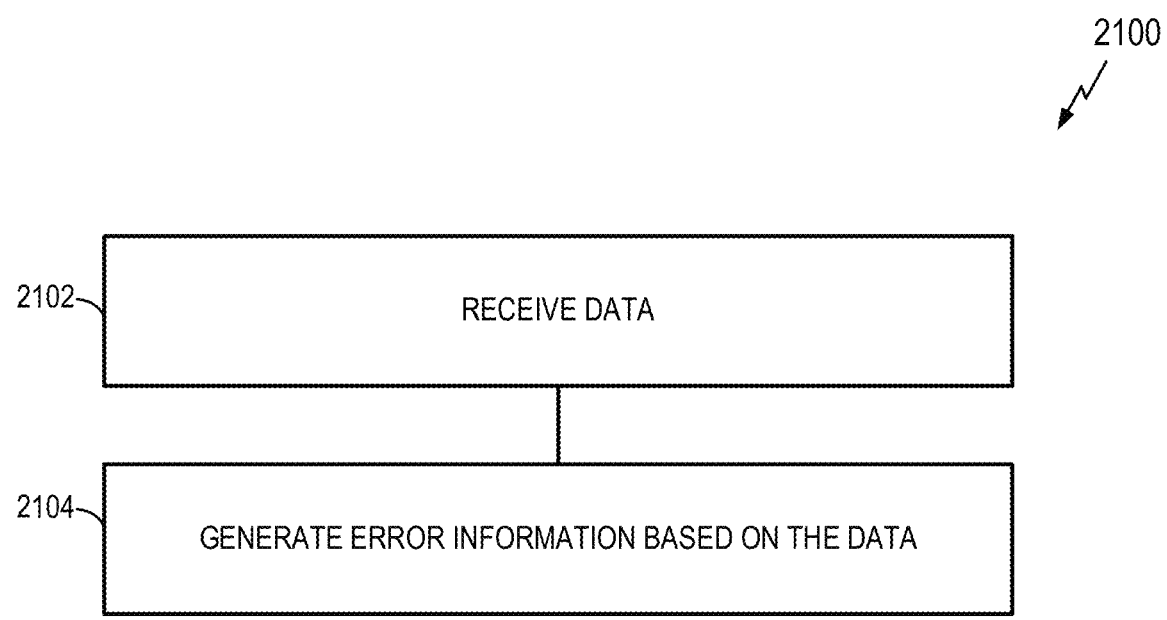
FIG. 21 illustrates an example process for providing error information in accordance with one or more aspects of the disclosure.

FIG. 21 illustrates a process 2100 for communication in accordance with some aspects of the disclosure. One or more aspects of the process 2100 may be used in conjunction with (e.g., in addition to or as part of) the process 2000 of FIG. 20. The process 2100 may take place within a processing circuit (e.g., the processing circuit 1910 of FIG. 19), which may be located in a controller, an SSD storage device, an SSD drive, a programmer device, a host device, or some other suitable apparatus. Of course, in various aspects within the scope of the disclosure, the process 2100 may be implemented by any suitable apparatus capable of supporting memory-related operations.

At block 2102, an apparatus (e.g., a programmer device, or a controller of a solid state drive) receives data. For example, a controller of a solid state drive may receive data from one or more NVM devices (e.g., as discussed above in conjunction with FIG. 7). As another example, a programmer device may receive data from a controller of a solid state drive (e.g., that obtained the data from an NVM device of the solid state drive).

At block 2104, the apparatus generates error information based on the data. For example, the apparatus may collect statistics based on the data as taught herein to generate the error information (e.g., as discussed above in conjunction with FIG. 9).

In some aspects, a process in accordance with the teachings herein may include any combination of the above operations.

Additional Aspects

The disclosure relates in some aspects to an apparatus for controlling a non-volatile memory device. The apparatus includes: an interface to the non-volatile memory device; and a processor coupled to the interface. In some embodiments, the processor is configured to: obtain error information for a plurality of memory cell bin boundaries of the non-volatile memory device, determine a plurality of sets of write levels for programming the non-volatile memory device based on the error information, and output the plurality of sets of write levels via the interface. In some aspects, the determination of the plurality of sets of write levels may include: generating a first set of the plurality of sets for a first condition; and generating a second set of the plurality of sets for a second condition. In some aspects, the first condition may include a first temperature; and the second condition may include a second temperature. In some aspects, the first condition may include a first non-volatile memory wear condition; and the second condition may include a second non-volatile memory wear condition. In some aspects, the first condition may include a first data retention condition; and the second condition may include a second data retention condition. In some aspects, to obtain the error information and to determine the plurality of sets of write levels, the processor may be further configured to iteratively: generate write level gradients based on the error information; and update the error information. In some embodiments, the apparatus may be a non-volatile memory controller. In this case, the processor may be further configured to receive data via the interface; and the obtaining of the error information may include generating the error information based on the data. In some embodiments, the apparatus may be a programmer device. In this case, the obtaining of the error information may include generating the error information.

The disclosure relates in some aspects to a method of controlling a non-volatile memory device. In some embodiment, the method may include: generating error information for a plurality of memory cell bin boundaries of the non-volatile memory device; determining a plurality of sets of write levels for programming the non-volatile memory device based on the error information; and outputting the plurality of sets of write levels. In some aspects, the determination of the plurality of sets of write levels may include: obtaining inputs for a matrix algorithm; and iteratively invoking the matrix algorithm. In some aspects, the inputs may include: a target error rate, error proportion information, cell range information, and a correlation model. In some aspects, the matrix algorithm may include: multiplying the error information for the plurality of memory cell bin boundaries with the error proportion information to generate a first vector; calculating a logarithm of each element of the first vector to generate a second vector; generating a pseudo inverse matrix from the correlation model; and multiplying the second vector with the pseudo inverse matrix. In some aspects, the target error rate may be for a particular page of the non-volatile memory device; the iterative invocation of the matrix algorithm may set a cell voltage range for writes to the particular page according to the target error rate; the correlation model may be for different Gray code pages of the non-volatile memory device; and the iterative invocation of the matrix algorithm may set a first error rate for a first page of the Gray code pages to be substantially equal to a second error rate for a second page of the Gray code pages. In some aspects, the error information may be for a particular memory use condition.

The disclosure relates in some aspects to an apparatus for controlling a non-volatile memory device. In some embodiments, the apparatus may include: means for obtaining error information for a plurality of memory cell bin boundaries of the non-volatile memory device; means for determining a plurality of sets of write levels for programming the non-volatile memory device based on the error information; and means for outputting the plurality of sets of write levels. In some aspects, the determination of the plurality of sets of write levels may include: generating a first set of the plurality of sets for a first condition; and generating a second set of the plurality of sets for a second condition. In some aspects, the first condition may include: a first temperature, a first non-volatile memory wear condition, a first data retention condition, or any combination thereof; and the second condition may include: a second temperature, a second non-volatile memory wear condition, a second data retention condition, or any combination thereof.

Other Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage apparatus, comprising:
a non-volatile memory array; and
a processor coupled to the non-volatile memory array and configured to:
determine error information for a plurality of memory cell bin boundaries of the non-volatile memory array,
determine a plurality of sets of write levels for programming the non-volatile memory array, wherein each particular set of write levels in the plurality of sets of write levels is based on the error information,
select a particular set of write levels from the plurality of sets of write levels, and
program the non-volatile memory array using the particular set of write levels.

2. The apparatus of claim 1, wherein the plurality of sets of write levels comprises:
a first set of write levels for a first condition; and
a second set of write levels for a second condition.

3. The apparatus of claim 2, wherein, to select the particular set of write levels, the processor is further configured to:
determine a current condition associated with the non-volatile memory array;
determine which of the first condition and the second condition matches the current condition; and
select one of the first set of write levels and the second set of write levels for the programming of the non-volatile memory array based on the determination of which of the first condition and the second condition matches the current condition.

4. The apparatus of claim 3, wherein:
the first condition comprises: a first temperature, a first non-volatile memory wear condition, a first data retention condition, or any combination thereof; and
the second condition comprises: a second temperature, a second non-volatile memory wear condition, a second data retention condition, or any combination thereof.

5. The apparatus of claim 1, wherein, to determine the error information and to determine the plurality of sets of write levels, the processor is further configured to iteratively:
generate write level gradients based on the error information;
update a set of read levels for reading the non-volatile memory array; and
update the error information.

6. The apparatus of claim 5, wherein the generation of the write level gradients comprises simultaneously generating:
a first gradient of the write level gradients for a first bin boundary of the plurality of memory cell bin boundaries; and
a second gradient of the write level gradients for a second bin boundary of the plurality of memory cell bin boundaries.

7. The apparatus of claim 6, wherein the first gradient is orthogonal to the second gradient.

8. The apparatus of claim 1, further comprising an interface, wherein to determine the plurality of sets of write levels, the processor is further configured to:
output the error information via the interface; and
receive the plurality of sets of write levels via the interface.

9. The apparatus of claim 1, wherein:
the apparatus is a solid state drive.

10. A data storage apparatus, comprising:
a non-volatile memory array; and
a processor coupled to the non-volatile memory array and configured to:
determine error information for a plurality of memory cell bin boundaries of the non-volatile memory array,
determine at least one set of write levels for programming the non-volatile memory array, wherein the at least one set of write levels is based on the error information, and
program the non-volatile memory array using a particular set of write levels of the least one set of write levels,
wherein to determine the plurality of sets of write levels, the processor is further configured to:
generate a first set of write levels for a first future condition; and
generate a second set of write levels for a second future condition.

11. The apparatus of claim 10, wherein:
to determine the error information, the processor is configured to determine current error information for a current condition; and
to determine the plurality of sets of write levels, the processor is configured to adjust the first set of write levels and the second set of write levels based on the current error information.

12. A data storage method, comprising:
obtaining data from a non-volatile memory array;
determining error information for a plurality of memory cell bin boundaries of the non-volatile memory array, wherein the determination of the error information is based on the data;
determining a plurality of sets of write levels for programming the non-volatile memory array, wherein each particular set of write levels in the plurality of sets of write levels is based on the error information;
selecting a particular set of write levels from the plurality of sets of write levels; and
programming the non-volatile memory array using the particular set of write levels.

13. The method of claim 12, wherein:
a first boundary of the plurality of memory cell bin boundaries is between a first bin and a second bin adjacent the first bin;
a subset of the error information for the first boundary comprises a first count of data bits written in error to the first bin instead of the second bin; and
the subset of error information further comprises a second count of data bits written in error to the second bin instead of the first bin.

14. The method of claim 13, wherein determining a plurality of sets of write levels comprises:
obtaining inputs for a matrix algorithm; and
iteratively invoking the matrix algorithm in conjunction with updating the first count and the second count.

15. The method of claim 14, wherein the inputs comprise:
a target error rate, error proportion information, cell range information, a correlation model, or any combination thereof.

16. The method of claim 14, wherein:
the inputs comprise a target error rate for a page of the non-volatile memory array; and
the iterative invocation of the matrix algorithm sets a cell voltage range for writes to the page according to the target error rate.

17. The method of claim 14, wherein:
the inputs comprise a correlation model for different Gray code pages of the non-volatile memory array; and
the iterative invocation of the matrix algorithm sets a first error rate for a first page of the Gray code pages to be substantially equal to a second error rate for a second page of the Gray code pages.

18. A data storage apparatus, comprising:
means for determining error information for a plurality of memory cell bin boundaries of a non-volatile memory array;
means for determining a plurality of sets of write levels for programming the non-volatile memory array, wherein each particular set of write levels in the plurality of sets of write levels is based on the error information;
means for selecting a particular set of write levels from the plurality of sets of write levels; and
means for programming the non-volatile memory array using the particular set of write levels.

19. The apparatus of claim 18, wherein:
each particular set of the plurality of sets of write levels is associated with a corresponding condition of a plurality of conditions defined for the non-volatile memory array.

20. The apparatus of claim 19, wherein the means for determining a plurality of sets of write levels comprises:
means for determining a current condition associated with the non-volatile memory array;
means for determining which of the plurality of conditions matches the current condition; and
means for selecting one set of the plurality of sets of write levels based on the determination of which of the plurality of conditions matches the current condition.

* * * * *